(12) United States Patent
Kumagai et al.

(10) Patent No.: US 8,308,188 B2
(45) Date of Patent: *Nov. 13, 2012

(54) PASSENGER AIRBAG APPARATUS

(75) Inventors: Masayoshi Kumagai, Tokyo (JP);
Yasuhito Miyata, Tokyo (JP)

(73) Assignee: Takata Corporation, Tokyo (JP)

( * ) Notice: Subject to any disclaimer, the term of this patent is extended or adjusted under 35 U.S.C. 154(b) by 150 days.

This patent is subject to a terminal disclaimer.

(21) Appl. No.: 12/320,457

(22) Filed: Jan. 27, 2009

(65) Prior Publication Data
US 2009/0295135 A1    Dec. 3, 2009

(30) Foreign Application Priority Data
May 30, 2008    (JP) .................................. 2008-143017

(51) Int. Cl.
*B60R 21/20*    (2011.01)
*B60R 21/205*    (2011.01)

(52) U.S. Cl. .................... 280/732; 280/743.1; 280/743.2
(58) Field of Classification Search .................. 280/731, 280/732, 743.1, 743.2
See application file for complete search history.

(56) References Cited

U.S. PATENT DOCUMENTS

| 6,070,904 | A  | * | 6/2000  | Ozaki et al. ................. | 280/743.1 |
| 6,131,944 | A  | * | 10/2000 | Henkel et al. ............... | 280/728.3 |
| 6,474,686 | B1 | * | 11/2002 | Higuchi et al. ............. | 280/743.1 |
| 6,877,772 | B2 | * | 4/2005  | Fischer et al. .............. | 280/743.1 |
| 7,396,044 | B2 | * | 7/2008  | Bauer et al. ................. | 280/743.2 |
| 7,404,575 | B2 | * | 7/2008  | Bito et al. ................... | 280/743.1 |
| 7,407,180 | B2 | * | 8/2008  | Yokoyama et al. ......... | 280/728.2 |
| 7,712,769 | B2 | * | 5/2010  | Hasebe et al. ............... | 280/729   |
| 7,717,460 | B2 | * | 5/2010  | Franke et al. ............... | 280/743.1 |
| 7,731,230 | B2 | * | 6/2010  | Fischer et al. .............. | 280/732   |
| 7,770,925 | B2 | * | 8/2010  | Seymour et al. ............ | 280/743.1 |
| 2005/0212275 | A1 | * | 9/2005 | Hasebe ....................... | 280/743.1 |
| 2007/0018438 | A1 | * | 1/2007 | Hasebe et al. .............. | 280/729   |
| 2008/0217892 | A1 | * | 9/2008 | Maripudi et al. ............ | 280/740   |
| 2009/0152842 | A1 | * | 6/2009 | Benny et al. ................ | 280/728.3 |
| 2009/0295136 | A1 | * | 12/2009 | Kumagai et al. .......... | 280/743.1 |

FOREIGN PATENT DOCUMENTS

| JP | H08-108816   | 4/1996 |
| JP | 2000-247199  | 9/2000 |
| JP | 3406277      | 3/2003 |
| JP | 2004-244005  | 9/2004 |

* cited by examiner

*Primary Examiner* — Paul N Dickson
*Assistant Examiner* — Timothy Wilhelm
(74) *Attorney, Agent, or Firm* — Manabu Kanesaka

(57) ABSTRACT

An airbag apparatus for a vehicle includes an airbag having a left airbag section and a right airbag section inflatable at left and right sides in a front area of an occupant, a retainer for retaining the airbag, and a first deployment-limiting sheet having one end coupled to the airbag or the retainer. The first deployment-limiting sheet at least partly overlaps the airbag and extends along the airbag from a rear portion to a front portion of the airbag. The first deployment-limiting sheet extends along the rear portion of the airbag during inflation thereof.

14 Claims, 24 Drawing Sheets

PASSENGER AIRBAG APPARATUS

BACKGROUND OF THE INVENTION AND RELATED ART STATEMENT

The present invention relates to a passenger airbag apparatus including a twin airbag having a left airbag section inflatable at a left side in a front area of an occupant and a right airbag section inflatable at a right side in the front area of the occupant. In particular, among the passenger airbag apparatus, the present invention relates to a passenger airbag apparatus including a deployment-limiting sheet that limits a deployment form of an airbag during inflation.

A passenger airbag apparatus includes a retainer arranged inside a dashboard, a folded airbag arranged in the retainer, an inflator configured to inflate the airbag, and a lid-configured to close the retainer.

Such an airbag may be a twin airbag including a base-end chamber coupled to the retainer, a left airbag section connected to the base-end chamber and being inflatable at a left side in a front area of an occupant toward a rear side of a vehicle body, and a right airbag section connected to the base-end chamber and being inflatable at a right side in the front area of the occupant toward the rear side of the vehicle body (for example, Japanese Unexamined Patent Application Publication No. 2004-244005).

In the passenger airbag apparatus including the twin airbag, when the inflator spouts gas, the gas is supplied from the inflator to the base-end chamber. As a result, the gas inflates the base-end chamber first. Then, the gas flows from the base-end chamber to the left and right airbag sections. As a result, the gas inflates the left and right airbag sections respectively at the left and right sides in the front area of the occupant toward the rear side of the vehicle body.

A prior publication (Japanese Patent No. 3406277) discloses a passenger airbag apparatus including a deployment-limiting sheet configured to limit a deployment form of an airbag during inflation.

In the patent, a strip-shaped deployment-limiting sheet having a predetermined length is provided between a folded airbag and an inner surface of a lid. One end of the deployment-limiting sheet is coupled to a rear edge of a retainer, and the deployment-limiting sheet covers the folded airbag.

When the airbag is inflated, the deployment-limiting sheet extends along a rear portion of the airbag during the inflation. Friction is produced between the deployment-limiting sheet and the rear portion of the airbag. Due to the friction, a front portion of the airbag is deployed first, and the rear portion of the airbag is subsequently deployed.

An object of the present invention is, in a passenger airbag apparatus including a twin airbag having left and right airbag sections, to decrease a protruding speed of the airbag toward a rear side of a vehicle body during inflation of the airbag.

Further objects and advantages of the invention will be apparent from the following description of the invention.

SUMMARY OF THE INVENTION

A passenger airbag apparatus according to a first aspect of the present invention includes a retainer arranged inside a dashboard; a folded airbag arranged in the retainer; an inflator configured to inflate the airbag; and a lid configured to close the retainer, in which the airbag includes a left airbag section inflatable at a left side in a front area of an occupant, and a right airbag section inflatable at a right side in the front area of the occupant. The passenger airbag apparatus includes a deployment-limiting sheet, one end of the deployment-limiting sheet being coupled to the retainer or the airbag, at least a part of the deployment-limiting sheet being superposed on the folded airbag and extending along the folded airbag from a rear portion of the folded airbag to a front portion of the folded airbag. The deployment-limiting sheet is interposed between the folded airbag and the lid when the airbag is inflated, and the deployment-limiting sheet extends along the rear portion of the airbag during inflation.

In a passenger airbag apparatus according to a second aspect of the invention, in view of the first aspect, the deployment-limiting sheet extends along a recessed portion between the left airbag section and the right airbag section when the airbag is inflated.

In a passenger airbag apparatus according to a third aspect, in view of the first or second aspect, the one end of the deployment-limiting sheet is coupled to the retainer or the rear portion of the airbag.

In a passenger airbag apparatus according to a fourth aspect, in view of the third aspect, the other end of the deployment-limiting sheet is coupled to a front portion of the retainer, and an expected tear portion is provided at a position near the other end of the deployment-limiting sheet, the expected tear portion allowing the deployment-limiting sheet to be torn by a tensile force applied to the expected tear portion when the airbag is deployed.

In a passenger airbag apparatus according to a fifth aspect, in view of the first or second aspect, the airbag includes a coupling portion at which intermediate portions of facing surfaces of the left and right airbag sections in a front-rear direction of a vehicle body are coupled to each other, the facing surfaces of the left and right airbag sections facing each other while the airbag is inflated. Further, the airbag includes a communicating portion near a base end of the airbag with respect to the coupling portion, the communicating portion passing between the left airbag section and the right airbag section and allowing a front side of the airbag to communicate with a rear side of the airbag. The one end of the deployment-limiting sheet is coupled to the retainer or the front portion of the airbag, and the other end of the deployment-limiting sheet passes through the communicating portion and extends to the rear side of the airbag.

In a passenger airbag apparatus according to a sixth aspect, in view of any one of the first to fifth aspects, a shape-retaining sheet is coupled to the retainer or the deployment-limiting sheet, the shape-retaining sheet being configured to retain the shape of the folded airbag. Further, the shape-retaining sheet includes a shape-retainment release portion configured to release the shape retainment by an inflation pressure of the airbag.

In a passenger airbag apparatus according to a seventh aspect, in view of the sixth aspect, the shape-retainment release portion is the expected tear portion allowing the shape-retaining sheet to be torn when a tensile force applied to the shape-retaining sheet becomes a predetermined or higher tensile force.

In a passenger airbag apparatus according to an eighth aspect, in view of the sixth or seventh aspect, one end of the shape-retaining sheet is coupled to the deployment-limiting sheet, and the other end of the shape-retaining sheet is coupled to the front portion of the retainer.

A passenger airbag apparatus according to a ninth aspect, in view of any one of the first to eighth aspects, further includes a second deployment-limiting sheet, a base end of the deployment-limiting sheet being coupled to the rear portion of the retainer or the deployment-limiting sheet, a tip end of the deployment-limiting sheet being tucked into the folded airbag.

With the passenger airbag apparatus of the present invention, the deployment-limiting sheet extending along the rear portion of the airbag during the inflation is provided. Accordingly, when the airbag is inflated, friction is produced between the rear portion of the airbag during the inflation and the deployment-limiting sheet extending along the rear portion, thereby decreasing a protruding speed of the airbag toward the rear side of the vehicle body.

In the present invention, the recessed portion is provided between the left and right airbag sections of the airbag during the inflation. Since the deployment-limiting sheet extends along the recessed portion as described in the second aspect, the deployment-limiting sheet is prevented from being deviated to the left side or the right side of the airbag. Accordingly, the protruding speed of both the left and right airbag sections during the inflation becomes low.

When the airbag is inflated, the left airbag section receives a left portion of the chest of an occupant and the right airbag section receives a right portion of the chest of the occupant. The left and right portions of the chest have hard and strong ribs. That is, the airbag receives the occupant via the ribs. An intermediate region between the right and left airbag sections face a head part and a center portion of the chest near the sternum of the occupant. Hence, when the occupant contacts the airbag, the head part and the center portion of the chest near the sternum of the occupant only receive a relatively small reaction force from the airbag. Therefore, the head part and the portion near the sternum receive a small load.

With respect to the third aspect of the invention, the one end of the deployment-limiting sheet is coupled to the retainer or the rear portion of the airbag. In this case, the deployment-limiting sheet extends from the base end of the airbag along the rear portion of the airbag. Hence, the protruding speed of the airbag toward the rear side of the vehicle body can be efficiently decreased.

With the aspect of the fourth aspect, the other end of the deployment-limiting sheet is also coupled to the front portion of the retainer. Accordingly, during the inflation, the deployment-limiting sheet temporarily restrains further inflation of the airbag when the inflation of the airbag obtains a condition where the deployment-limiting sheet achieves a maximum deployment form. Then, when the tensile force produced at the deployment-limiting sheet by the inflation pressure of the airbag becomes a tear strength or higher of the expected tear portion, the expected tear portion is torn, and the airbag is further inflated. The restraint and tearing of the deployment-limiting sheet decreases an initial inflation speed of the airbag.

Also, the deployment-limiting sheet is torn at the expected tear portion after the deployment-limiting sheet achieves the maximum deployment form in which the sufficient tensile force is produced at the expected tear portion. A remaining piece of the deployment-limiting sheet, produced when the deployment-limiting sheet is torn after the deployment-limiting sheet achieves the maximum deployment form, is configured such that one end of the remaining piece is coupled to the retainer and that the other end thereof is a free end. In a later inflation phase of the airbag, the remaining piece extends along the rear portion of the airbag, thereby providing a similar function to that of the original deployment-limiting sheet.

The deployment-limiting sheet immediately before tearing has the maximum deployment form. The remaining piece of the deployment-limiting sheet produced by tearing has a predetermined shape according to the maximum deployment form.

With respect to the fifth aspect of the invention, the one end of the deployment-limiting sheet is coupled to the retainer or the front portion of the airbag, and the other end thereof passes through the communicating portion and extends to the rear side of the airbag.

Hence, in the initial inflation phase of the airbag, a frictional force is produced between the deployment-limiting sheet and the communicating portion, thereby reducing the inflation speed of the airbag. Accordingly, the protruding speed of the airbag from the retainer in the initial inflation phase of the airbag is decreased. Also, since the deployment-limiting sheet is inserted through the communicating portion, the deployment-limiting sheet is prevented from being deviated to the left side or the right side of the airbag.

With respect to the sixth aspect, the shape-retaining sheet configured to retain the shape of the folded airbag is provided. When the airbag starts to be inflated, the inflation pressure of the airbag is applied to the shape-retaining sheet. As a result, the shape-retainment release portion releases the shape retainment. Since the shape-retaining sheet retains the shape of the airbag until the shape-retaining sheet releases the shape retainment, a protruding speed of the airbag from the retainer in an initial inflation phase is decreased.

With respect to the seventh aspect, the tensile force is produced at the shape-retaining sheet by the inflation pressure of the airbag applied to the shape-retaining sheet. When the tensile force becomes the predetermined or higher tensile force, the shape-retaining sheet is torn and the shape retainment is released. Inflation energy of the airbag is partly consumed by tearing the shape-retaining sheet. As a result, the inflation speed of the airbag in the initial inflation phase of the airbag is decreased.

With respect to the eighth aspect, the one end of the shape-retaining sheet is coupled to the deployment-limiting sheet. Accordingly, the length of the shape-retaining sheet may be decreased as compared with a case where the one end of the shape-retaining sheet is directly coupled to the retainer. Accordingly, decreasing the length of the shape-retaining sheet can promote reduction in material cost of the sheet, reduction in package volume, reduction in weight of the passenger airbag apparatus, etc.

With respect to the ninth aspect, the second deployment-limiting sheet decreases the initial inflation speed of the airbag. In particular, the base end of the second deployment-limiting sheet is coupled to the retainer or the deployment-limiting sheet, and the tip end thereof is tucked into the airbag. Accordingly, when the folded airbag is to be inflated, friction is produced between a tip end of the second deployment-limiting sheet and the folded airbag. The friction decreases the inflation speed of the airbag.

DETAILED DESCRIPTION OF PREFERRED EMBODIMENTS

Embodiments of the present invention are described below with reference to the drawings.

Figure 1:
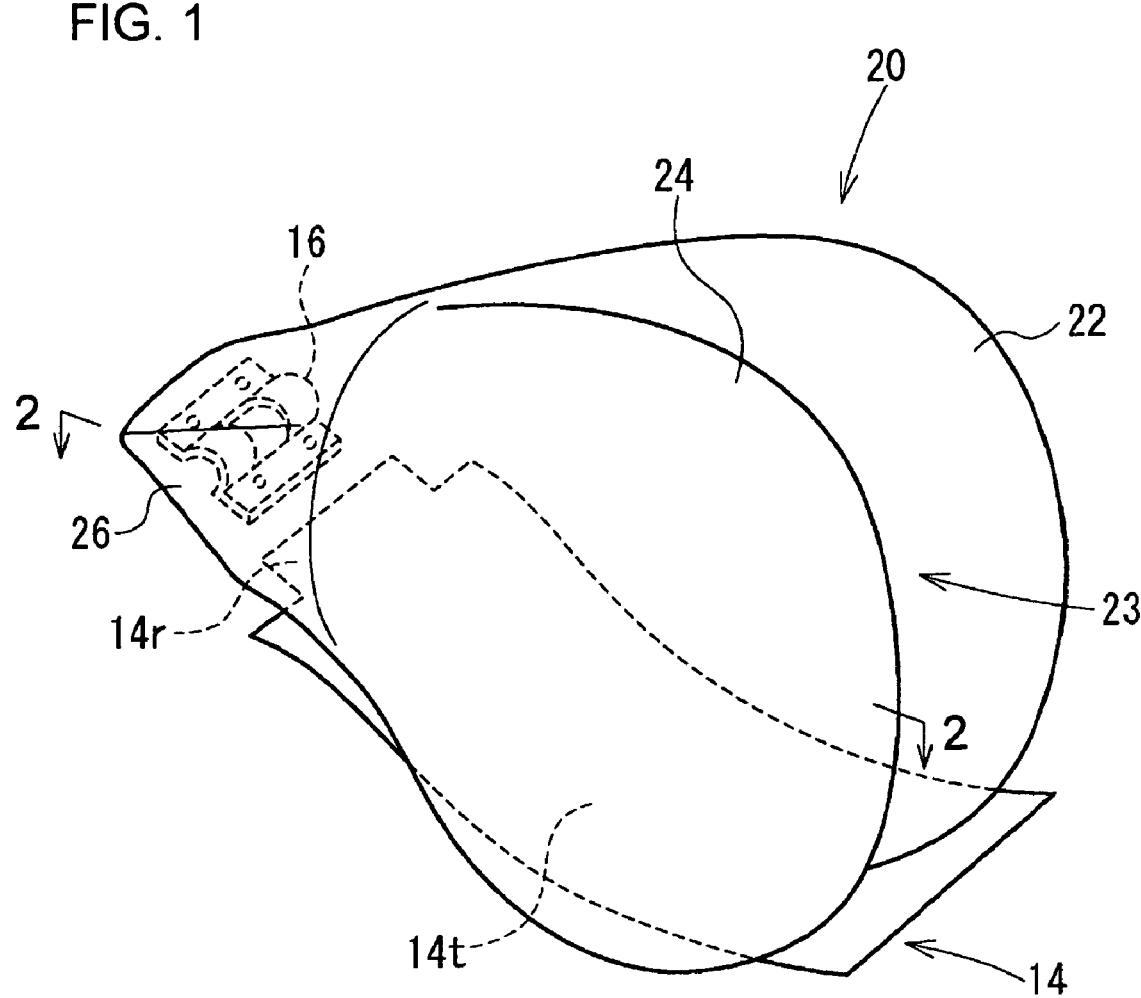
FIG. 1 is a perspective view showing an airbag of a passenger airbag apparatus according to an embodiment.
Figure 2:
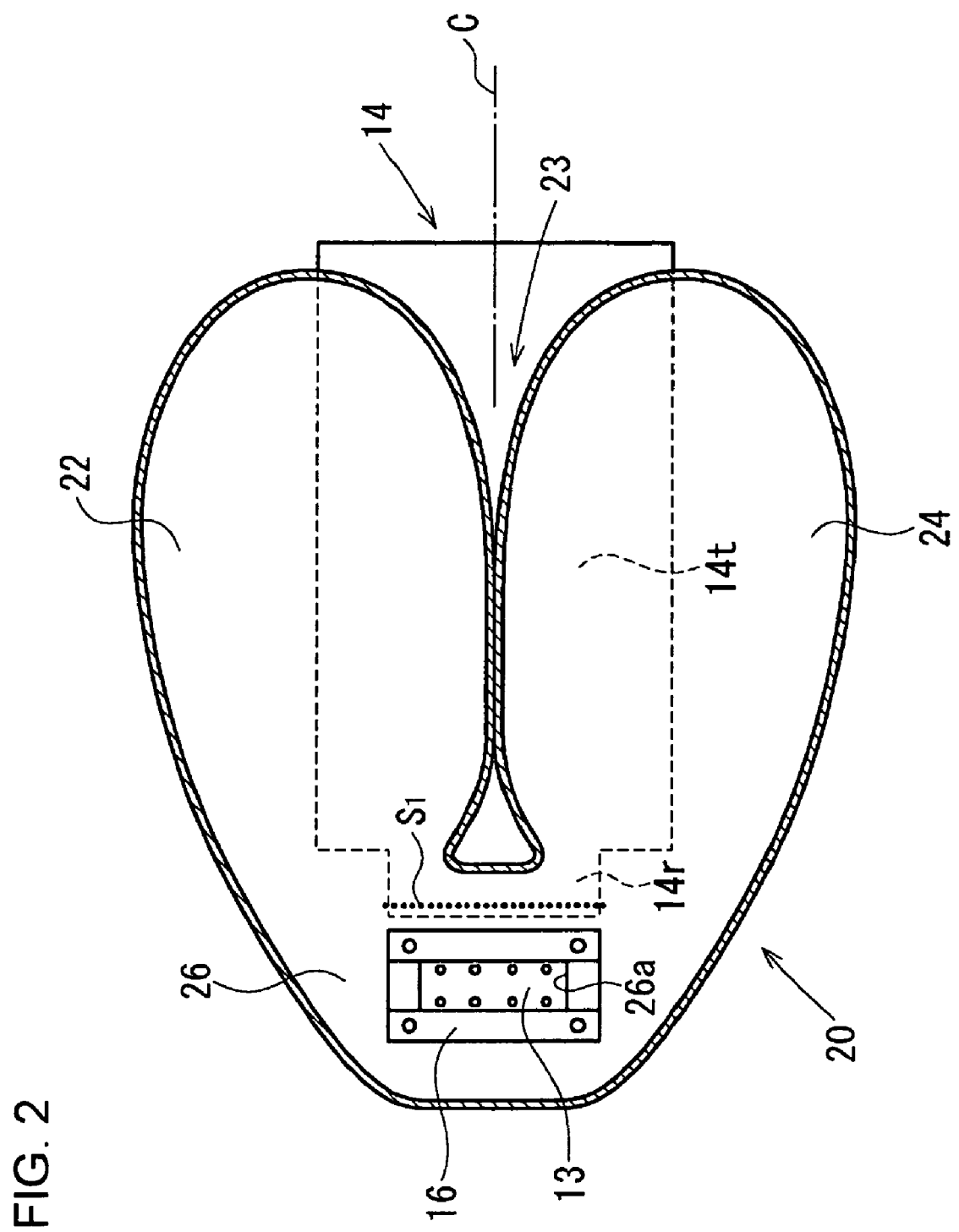
FIG. 2 is a sectional view taken along line 2-2 in FIG. 1.
Figure 3:
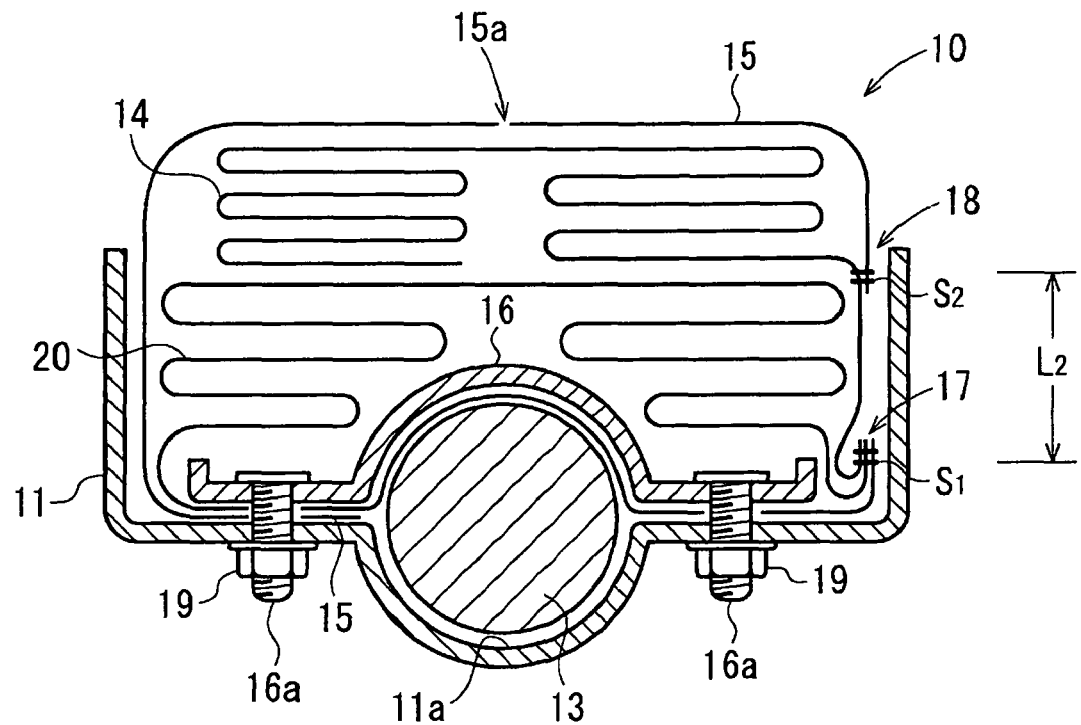
FIG. 3 is a longitudinal sectional view schematically showing the passenger airbag apparatus including the airbag in FIG. 1.
Figure 4:
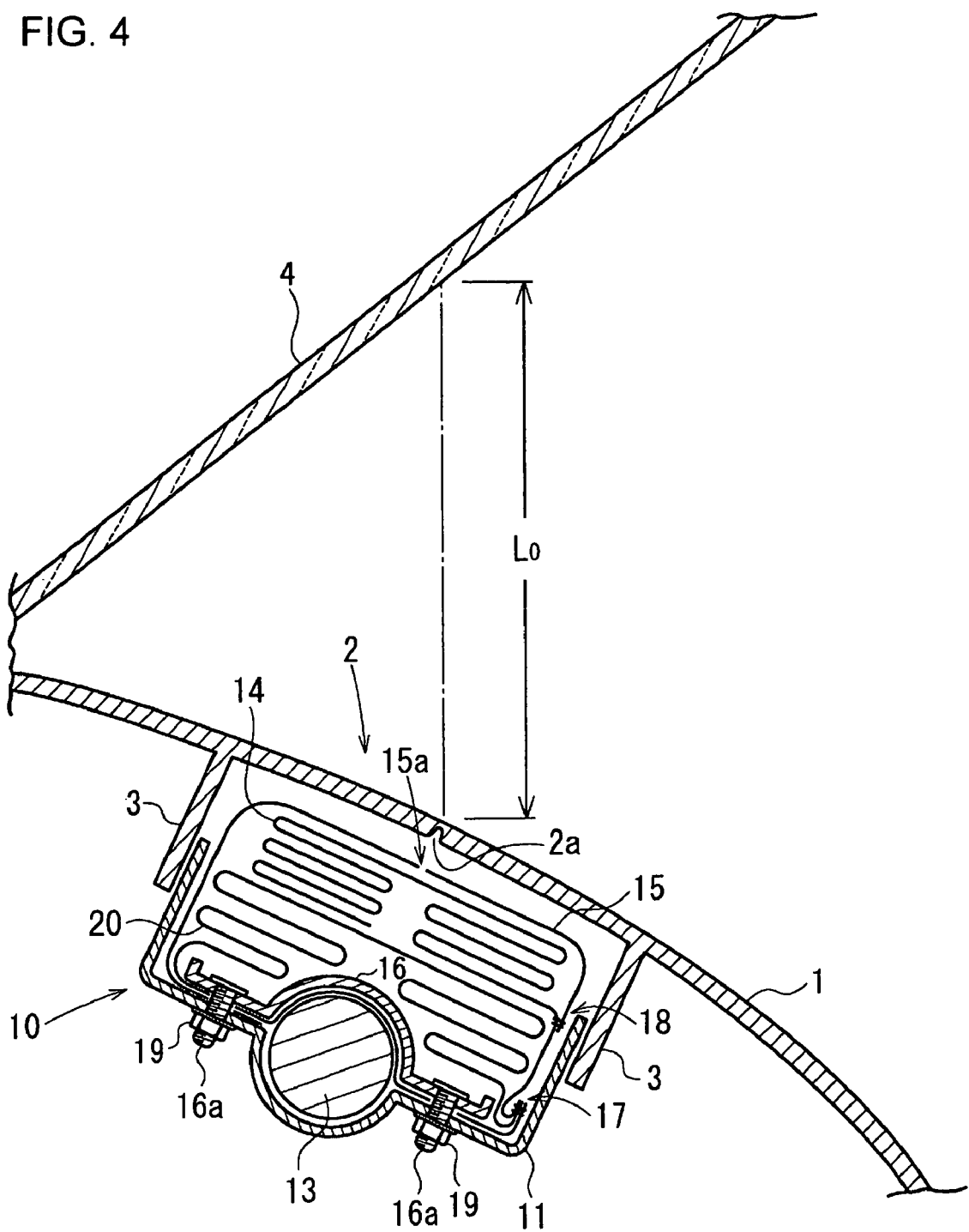
FIG. 4 is a longitudinal sectional view showing an area around an upper portion of a dashboard in a cabin, in which the passenger airbag apparatus in FIG. 3 is disposed.
Figure 5:
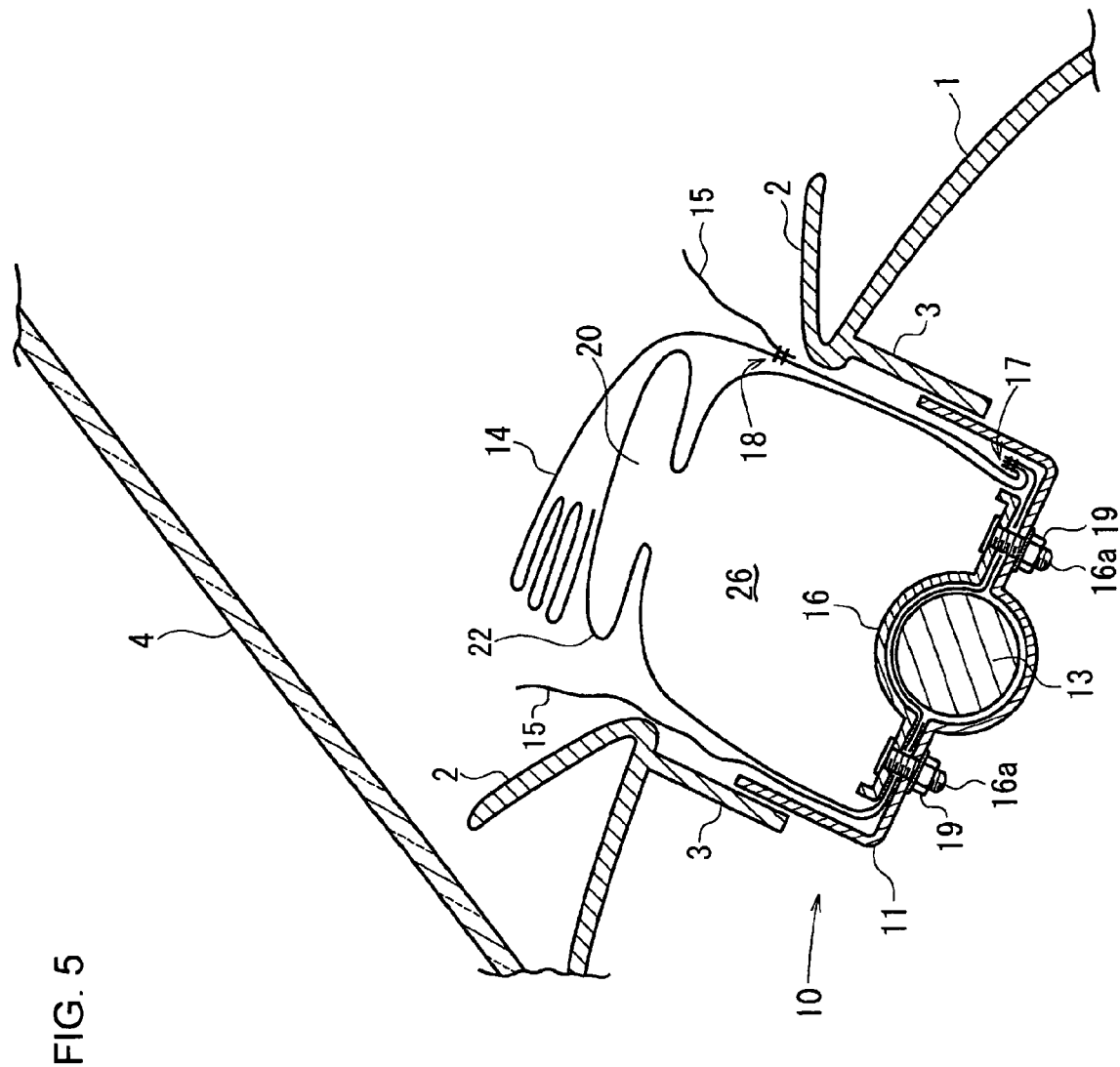
FIG. 5 is a longitudinal sectional view showing the area around the upper portion of the dashboard in the cabin, in which the passenger airbag apparatus in FIG. 3 is disposed.
Figure 6:
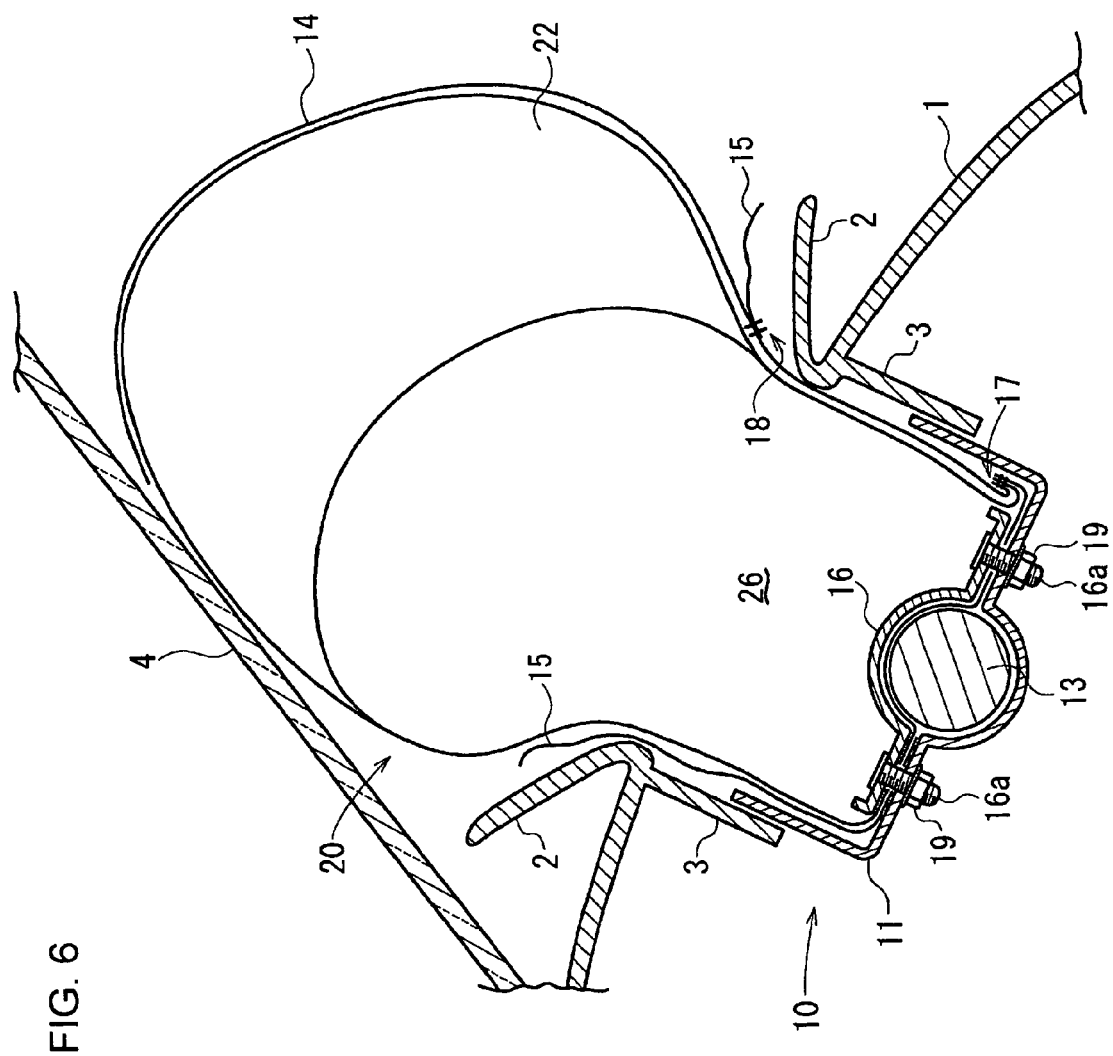
FIG. 6 is a longitudinal sectional view showing the area around the upper portion of the dashboard in the cabin, in which the passenger airbag apparatus in FIG. 3 is disposed.
Figure 7:
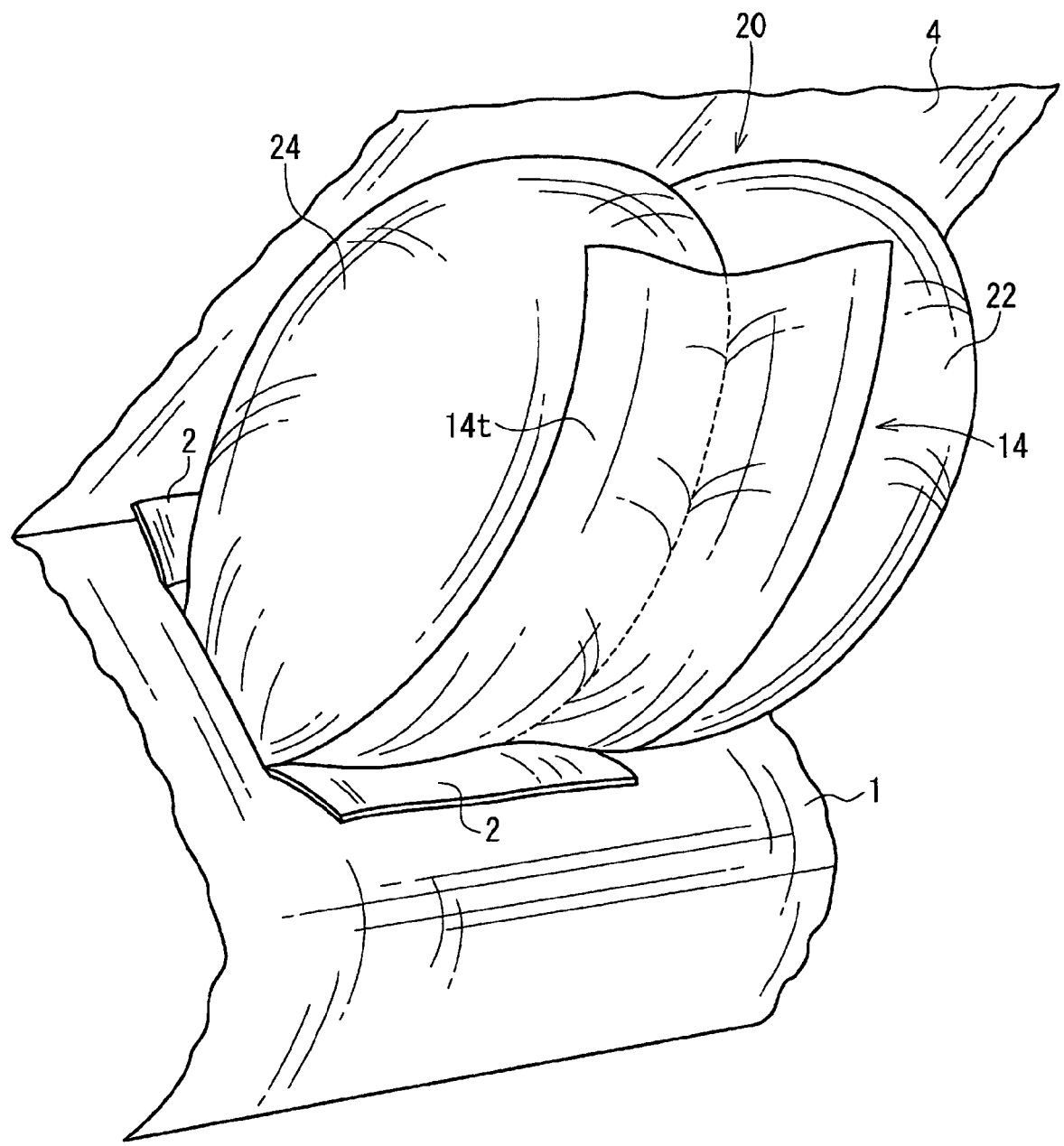
FIG. 7 is a perspective view showing the airbag in a phase of FIG. 6.
Figure 8:
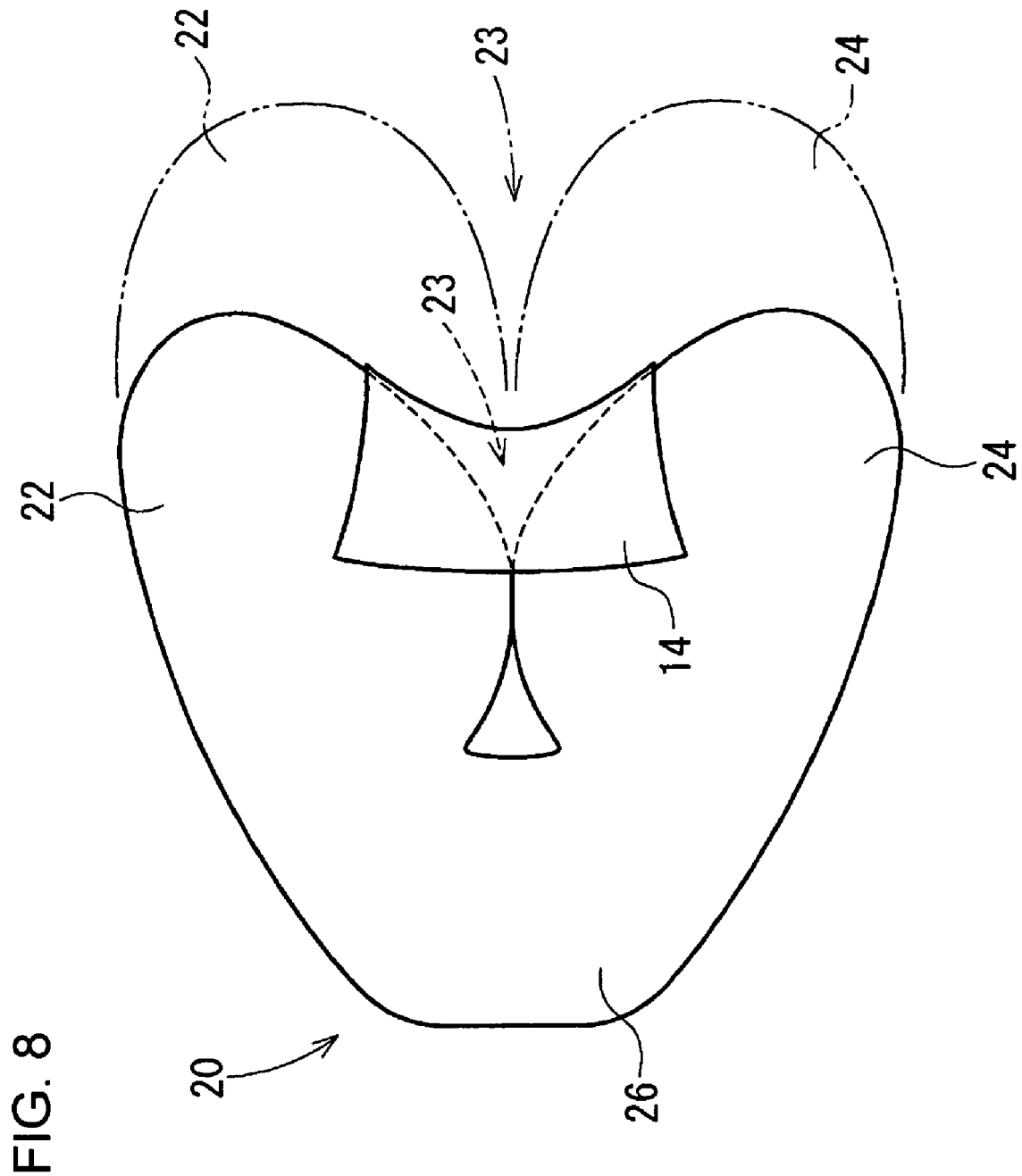
FIG. 8 is a top view showing the airbag in the phase of FIG. 6.
Figure 9:
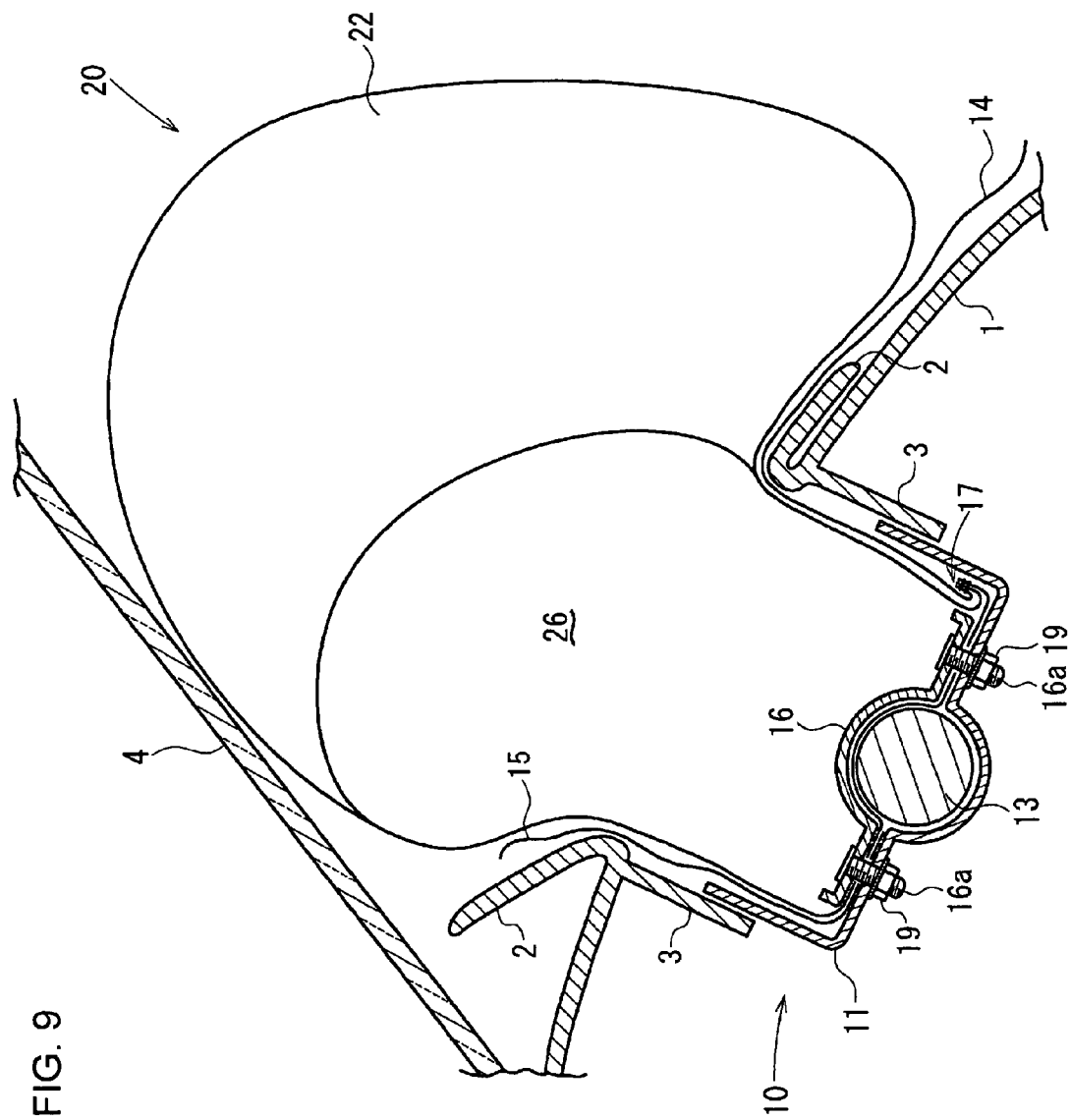
FIG. 9 is a sectional view showing an area similar to FIG. 4 when the airbag is completely inflated.

FIG. 1 is a perspective view showing an airbag of a passenger airbag apparatus according to an embodiment. FIG. 2 is a sectional view taken along line 2-2 in FIG. 1. FIG. 3 is a longitudinal sectional view schematically showing the passenger airbag apparatus including the airbag in FIG. 1. FIG. 4 is a longitudinal sectional view showing an area around an upper portion of a dashboard in a cabin, the passenger airbag apparatus being disposed in the area. FIGS. 5 and 6 are longitudinal sectional views, each showing an area similar to FIG. 4 in an initial inflation phase and in a middle inflation phase, respectively. FIG. 7 is a perspective view showing the airbag in the phase of FIG. 6. FIG. 8 is a top view showing the airbag in the phase of FIG. 6. FIG. 9 is a sectional view showing an area similar to FIG. 4 when the airbag is completely inflated.

Hereinafter, front and rear directions in the description correspond to front and rear directions of a vehicle body to which the passenger airbag apparatus is mounted. Left and right directions correspond to left and right directions from a viewpoint of an occupant on a passenger seat.

A passenger airbag apparatus 10 includes a retainer 11, which is a top-open container arranged inside a dashboard 1 in front of a passenger seat of an automobile; a folded airbag 20 arranged in the retainer 11; an inflator 13 configured to inflate the airbag 20; a deployment-limiting sheet 14 configured to limit deployment of a rear portion of the airbag 20 during inflation of the airbag 20; and a shape-retaining sheet 15 configured to retain the shape of the folded airbag 20.

As shown in FIG. 4, in this embodiment, a portion of a top panel of the dashboard 1 covering the retainer 11 defines a door 2 configured to be cleaved by an inflation pressure of the airbag 20 and open to a cabin when the airbag 20 is inflated. Reference character 2a denotes a tear line formed of a groove. The tear line 2a induces the cleavage of the door 2. That is, in this embodiment, the door 2 corresponds to a lid configured to lid the retainer 11. The lid is integrally formed with the dashboard 1. In the present invention, alternatively, the lid may be separately provided to the dashboard 1.

A peripheral-wall-like leg piece 3 vertically extends from the periphery of the door 2 toward the lower side. The retainer 11 is arranged to be fitted into the leg piece 3. The retainer 11 is engaged with the leg piece 3 by a hook (not shown) or the like.

The airbag 20 includes a right airbag section 22 inflatable at a right side in a front area of an occupant, a left airbag section 24 inflatable at a left side in the front area of the occupant, and a base-end chamber 26 which allows the right and left airbag sections 22, 24 to communicate with each other at their front portions.

While the airbag 20 is inflated, a bridge member such as a tie panel is not present between rear ends of the right and left airbag sections 22, 24. Instead, a space 23 is provided between the rear ends of the bags 22, 24 so as to be open toward the occupant (i.e., toward a right side in FIGS. 1 and 2).

When the airbag 20 is completely inflated, a distance between a rear tip end of the right airbag section 22 and a rear tip end of the left airbag section 24 may be preferably in a range from 150 to 450 mm, and more particularly, in a range from 170 to 430 mm.

As shown in FIG. 9, as to an inflation form of the airbag 20, the airbag 20 pushes and opens the door 2, starts to be inflated into the cabin, and is deployed such that the base-end chamber 26 and front portions of the right and left airbag sections 22, 24 fill a space between the top panel of the dashboard 1 and a windshield 4 and that rear portions of the right and left airbag sections 22, 24 are inflated to rear and lower sides of the vehicle body and fill a space in front of the passenger seat.

A gas inlet 26a (FIG. 2) is provided in a bottom surface of the base-end chamber 26. A peripheral edge of the gas inlet 26a and the inflator 13 are coupled to a bottom surface of the retainer 11 by a pressing plate 16.

In this embodiment, the inflator 13 is a column, and is arranged in the retainer 11 while an axial direction of the inflator 13 is aligned with a vehicle-body-width direction. A substantially semicylindrical recess 11a (FIG. 3) is provided at the bottom surface of the retainer 11. A substantially lower half portion of the inflator 13 is fitted into the recess 11a.

The pressing plate 16 includes a pair of substantially C-shaped band portions (reference numeral omitted) covering an outer peripheral surface of the inflator 13 at both ends in the axial direction of the inflator 13 from above; flange portions (reference numeral omitted) coupling both ends of the band portions and extending from both ends of the band portions along the bottom surface of the retainer 11 toward the front and rear sides; and stud bolts 16a protruding from the flange portions toward the lower side. A front edge portion and a rear edge portion of the gas inlet 26a at the bottom surface of the base-end chamber 26 have bolt insertion holes (reference numeral omitted) through which the stud bolts 16a are respectively inserted.

The deployment-limiting sheet 14 is formed of a strip-shaped sheet having a predetermined length. In this embodiment, one end (hereinafter, also referred to as a base-end) of the deployment-limiting sheet 14 is coupled to a rear portion of the base-end chamber 26 of the airbag 20. The coupling position of the deployment-limiting sheet 14 to the base-end chamber 26 may be preferably located at a distance of at least 300 mm, and more particularly, in a range from 400 to 550 mm, from a rear edge of the gas inlet 26a along an outer surface of the base-end chamber 26 toward the rear side of the vehicle body. In the present invention, the base end of the deployment-limiting sheet 14 may be coupled to the bottom surface of the retainer 11 or a rear portion of the peripheral wall.

The airbag 20 is formed into a bag by sawing base fabrics. In this embodiment, a sewing portion 17, which sews the base fabrics together, is arranged in the outer surface of the base-end chamber 26 at a position at slightly rear side with respect to the gas inlet 26a. Reference character $S_1$ in FIGS. 2 and 3 denotes a seam formed of, for example, a sewing thread sewing the base fabrics together. The sewing portion 17 extends in the vehicle-body-width direction.

In this embodiment, when the airbag 20 is to be sewed, a base end of the deployment-limiting sheet 14 is superposed on the base fabrics of the sewing portion 17, and sewed with the seam $S_1$ together with the base fabrics. Thus, the deployment-limiting sheet 14 is coupled to the airbag 20. It is to be noted that the coupling method of the deployment-limiting sheet 14 to the airbag 20 is not limited thereto.

In this embodiment, the other end (hereinafter, also referred to as a tip end) of the deployment-limiting sheet 14 is a free end.

A length $L_1$ (not shown) of the deployment-limiting sheet 14 from a coupling portion (sewing portion 17) of the deployment-limiting sheet 14 with the base-end chamber 26 to the other end is greater than a distance $L_0$ (FIG. 4) from a substantially center position of the door 2 in the front-rear direction of the vehicle body to the windshield 4 located vertically above the substantially center position.

In this embodiment, as shown in FIG. 2, in the deployment-limiting sheet 14, a width of a portion 14r that is not deployed from the door 2 into the cabin but remains at a back side of the dashboard 1 during inflation of the airbag 20 (hereinafter, referred to as dashboard remaining portion) is substantially equivalent to a width of the retainer 11 in the vehicle-body-width direction or a width of the folded airbag 20 in the vehicle-width direction.

In this embodiment, in the deployment-limiting sheet 14, a width of a portion 14t that expands from the door 2 into the cabin during the inflation of the airbag 20 (hereinafter, referred to as cabin deploying portion) is greater than the width of the dashboard remaining portion 14r. The width of the cabin deploying portion 14t may be preferably at least 100 mm, and more particularly, in a range from 160 to 300 mm.

In the present invention, alternatively, the width of the dashboard remaining portion 14r may be greater than the width of the cabin deploying portion 14t.

In this embodiment, as shown in FIGS. 2, 7, and 8, the deployment-limiting sheet 14 is bridged across the rear portions of the right and left airbag portions 22, 24. In the present invention, the cabin deploying portion 14t of the deployment-limiting sheet 14 may preferably extend from a center position C (FIG. 2) between the right and left airbag sections 22, 24 toward the right airbag section 22 and toward the left airbag section 24 by a length in a range from 50 to 200 mm, respectively, and more particularly, in a range from 80 to 150 mm, respectively.

As shown in FIG. 2, in this embodiment, the deployment-limiting sheet 14 is disposed such that an intermediate portion of the deployment-limiting sheet 14 in its width direction is located near the center position C between the right and left airbag sections 22, 24, and the right and left sections of the deployment-limiting sheet 14 respectively face the right and left airbag sections 22, 24 by substantially equivalent widths. Alternatively, the deployment-limiting sheet 14 may be disposed to be deviated toward the right airbag section 22 or the left airbag section 24 so that a width of a portion of the deployment-limiting sheet 14 facing the right airbag section 22 differs from a width of a portion of the deployment-limiting sheet 14 facing the left airbag section 24.

In this embodiment, the shape-retaining sheet 15 is also formed of a strip-shaped sheet.

In this embodiment, the shape-retaining sheet 15 is arranged opposite to the airbag 20 with respect to the deployment-limiting sheet 14, the longitudinal direction of the shape-retaining sheet 15 being substantially parallel to the deployment-limiting sheet 14. One end (hereinafter, also referred to as a base end) of the shape-retaining sheet 15 is coupled to an intermediate portion in the longitudinal direction of the deployment-limiting sheet 14. In this embodiment, the base end of the shape-retaining sheet 15 is coupled to an intermediate portion of the dashboard remaining portion 14r of the deployment-limiting sheet 14. Reference numeral 18 denotes a coupling portion at the base end of the shape-retaining sheet 15 to the deployment-limiting sheet 14. In this embodiment, the base end of the shape-retaining sheet 15 is sewed to the deployment-limiting sheet 14 with a seam $S_2$ (FIG. 3) formed of, for example, a sewing thread. The seam $S_2$ has a strength that is not torn even if a predetermined or higher tensile force is applied to the shape-retaining sheet 15. It is to be noted that the coupling method of the shape-retaining sheet 15 to the deployment-limiting sheet 14 is not limited thereto.

In this embodiment, the base end of the shape-retaining sheet 15 is coupled to a rear portion of the base-end chamber 26 of the airbag 20 via the deployment-limiting sheet 14. In the present invention, a distance $L_2$ (FIG. 3) from the sewing portion 17, which couples the deployment-limiting sheet 14 to the base-end chamber 26, to the coupling portion 18, which couples the shape-retaining sheet 15 to the deployment-limiting sheet 14, may be preferably in a range from 10 to 110 mm, and more particularly, in a range from 20 to 60 mm.

Since the base-end of the shape-retaining sheet 15 is coupled to the intermediate portion of the deployment-limiting sheet 14, the length of the shape-retaining sheet 15 is decreased by at least the distance $L_2$, as compared with a case where the base end of the shape-retaining sheet 15 is directly coupled to the base-end chamber 26 of the airbag 20 or the retainer 11. Accordingly, decreasing the length of the shape-retaining sheet 15 can promote reduction in material cost of the shape-retaining sheet 15, reduction in package volume of the folded airbag 20, reduction in weight of the passenger airbag apparatus 10, etc.

In this embodiment, an expected tear portion 15a serving as a shape-retainment release portion is provided at an intermediate portion in the longitudinal direction of the shape-retaining sheet 15. In this embodiment, the expected tear portion 15a is a slit with perforations extending across the shape-retaining sheet 15 in the width direction. The shape-retaining sheet 15 is torn along the expected tear portion 15a when a predetermined or higher tensile force is applied to the shape-retaining sheet 15 in the longitudinal direction. The shape-retaining sheet 15 is separated into one end portion and the other end portion at the expected tear portion 15a, thereby releasing the shape retainment.

It is to be noted that the structure of the expected tear portion of the shape-retaining sheet 15 is not limited thereto. For example, instead of providing the slit with perforations as the expected tear portion in the shape-retaining sheet 15, the seam $S_2$, which couples the shape-retaining sheet 15 to the deployment-limiting sheet 14, may serve as a seam with a low strength (so called tear seam) that is torn by a predetermined or higher tensile force. Accordingly, when the predetermined or higher tensile force is applied to the shape-retaining sheet 15, the seam $S_2$ is torn and the shape-retaining sheet 15 is separated from the deployment-limiting sheet 14, thereby releasing the shape retainment.

The other end (hereinafter, also referred to as a tip end) of the shape-retaining sheet 15 has a bolt insertion hole (reference numeral omitted) through which the stud bolt 16a of the pressing plate 16 is inserted.

A procedure from folding to shape retainment of the airbag 20 is described below.

In this embodiment, before the airbag 20 is folded, the pressing plate 16 is arranged in the base-end chamber 26 via the gas inlet 26a. The stud bolts 16a of the pressing plate 16 are inserted through the bolt insertion holes in the bottom surface of the base-end chamber 26 to extend out the airbag 20, and the flange portions of the pressing plate 16 are superposed on the peripheral edge of the gas inlet 26a.

Then, as shown in FIG. 3, the airbag 20 is folded into a block form, and is mounted on the pressing plate 16.

In this embodiment, the airbag 20 is folded by the procedure described below. First, the right and left airbag sections 22, 24 are spread flat such that left and right side surfaces of the bags are superposed. Then, the right and left airbag sections 22, 24 are folded so as to decrease a width in an up-down direction, and then to decrease a width in a front-rear direction. Then, the folded right and left airbag sections 22, 24 are mounted on the base-end chamber 26. Accordingly, the folded airbag in a block form as shown in FIG. 3 is obtained. It is noted that the folding method of the airbag 20 is not limited thereto.

In this embodiment, as shown in FIG. 3, while the entire airbag 20 is folded in a zigzag (concertina-like) manner, the airbag 20 may be folded by a folding method other than zigzag folding. For example, the airbag 20 may be rolled. Alternatively, the airbag 20 may be folded by a combination of a plurality of folding methods.

Then, as shown in FIG. 3, the deployment-limiting sheet 14 is drawn to the upper side along the rear portion of the folded airbag 20 and then is drawn to the front side along an upper side of the folded airbag 20. A portion of the deployment-limiting sheet 14 drawn to the upper side of the folded airbag 20 is folded into a block form, and is mounted on the folded airbag 20.

In this embodiment, the coupling portion 18, which couples the shape-retaining sheet 15 to the deployment-limiting sheet 14, is located near an upper end of the portion of the deployment-limiting sheet 14 drawn to the upper side along the rear portion of the folded airbag 20.

In this embodiment, a substantially half part near the tip end and a substantially half part near the coupling portion 18 of the portion of the deployment-limiting sheet 14 drawn to the upper side of the folded airbag 20 are folded in a zigzag manner, and the parts are mounted on the folded airbag 20 at different front and rear positions. It is to be noted that the folding method of the deployment-limiting sheet 14 and the arrangement of the folded deployment-limiting sheet 14 are not limited thereto.

Then, the shape-retaining sheet 15 is drawn from the upper side of the folded deployment-limiting sheet 14 toward the front portion of the folded airbag 20. The tip end of the shape-retaining sheet 15 is arranged to the lower side of the folded airbag 20. The front stud bolt 16a of the pressing plate 16 is inserted through the bolt insertion hole at the tip end of the shape-retaining sheet 15. Hence, the shape-retaining sheet 15 is latched onto the stud bolt 16a.

Accordingly, the shape of the folded airbag 20 and the shape of the folded deployment-limiting sheet 14 are integrally retained by the shape-retaining sheet 15.

The inflator 13 is fitted into the recess 11a at the bottom surface of the retainer 11, and the folded airbag 20 with the shape thereof retained by the shape-retaining sheet 15 is arranged in the retainer 11, so that the pressing plate 16 is mounted on the inflator 13 from above. The stud bolts 16a are inserted through the bolt insertion holes (reference numerals omitted) in the bottom surface of the retainer 11, and nuts 19 are screwed to the stud bolts 16a from below the retainer 11. The pressing plate 16 is fixed to the bottom surface of the retainer 11, and the peripheral edge of the gas inlet 26a at the bottom surface of the base-end chamber 26, the tip end of the shape-retaining sheet 15, and the inflator 13 are integrally held and fixed between the pressing plate 16 and the bottom surface of the retainer 11. Accordingly, the passenger airbag apparatus 10 shown in FIG. 3 is formed.

Next, the activation of the passenger airbag apparatus 10 is described.

When the automobile with the passenger airbag apparatus 10 collides, the inflator 13 is activated, and supplies gas into the airbag 20. With the gas from the inflator 13, the airbag 20 starts to be inflated. The airbag 20 pushes and opens the door 2 and is inflated into the cabin.

When the inflation of the airbag 20 is started, the shape of the folded airbag 20 is retained by the shape-retaining sheet 15. As the airbag 20 starts to be inflated, an inflation pressure of the airbag 20 is applied to the shape-retaining sheet 15, thereby causing a tensile force at the shape-retaining sheet 15. When the tensile force becomes a predetermined or higher tensile force, as shown in FIG. 5, the shape-retaining sheet 15 is torn along the expected tear portion 15a, the shape retainment of the airbag 20 is released, and the airbag 20 starts to be inflated into the cabin through the door 2.

The inflation of the airbag 20 is restrained until the shape-retaining sheet 15 releases the shape retainment, and inflation energy of the airbag 20 is partly consumed by tearing the expected tear portion 15a of the shape-retaining sheet 15. Thus, an inflation speed of the airbag 20 is decreased in an initial inflation phase.

In the airbag 20, the gas is supplied from the inflator 13 into the base-end chamber 26 first, causing the base-end chamber 26 to be inflated. Then, the gas flows from the base-end chamber 26 to the right and left airbag sections 22, 24, causing the right and left airbag sections 22, 24 to be inflated.

At this time, as shown in FIG. 6, the deployment-limiting sheet 14 is deployed to the upper side along with the inflation of the base-end chamber 26 and the front portions of the right and left airbag sections 22, 24 to fill the space between the top panel of the dashboard 1 and the windshield 4. Then, as shown in FIGS. 6 and 7, the deployment-limiting sheet 14 extends along the rear portions of the right and left airbag sections 22, 24 during the inflation. Accordingly, a frictional force is applied between the deployment-limiting sheet 14 and the rear portions of the right and left airbag sections 22, 24, and a protruding speed of the right and left airbag sections 22, 24 toward the rear side, i.e., toward the passenger seat is decreased. Also, since the deployment-limiting sheet 14 extends along the recessed portion between the right and left airbag sections 22, 24, the deployment-limiting sheet 14 is prevented from being deviated to the left side or the right side of the airbag 20.

Then, as shown in FIG. 9, when inner pressures of the right and left airbag sections 22, 24 are sufficiently increased, the rear portions of the right and left airbag sections 22, 24 are inflated to push the deployment-limiting sheet 14 and to protrude to the rear and lower sides. The inflation of the airbag 20 is thus completed.

With the inflated airbag 20, the right airbag section 22 receives the right portion of the chest of an occupant and the left airbag section 24 receives the left portion of the chest of the occupant. The left and right portions of the chest have hard and strong ribs. That is, the airbag 20 receives the occupant via the ribs. The space 23 open to the occupant is provided between the right and left airbag sections 22, 24. A head part and a center portion of the chest near the sternum of the occupant face the space 23. Hence, when the occupant contacts the airbag 20, the head part and the center portion of the chest near the sternum of the occupant only receive a relatively small reaction force, resulting in the head part and the portion near the sternum receiving a small load.

As described above, in the passenger airbag apparatus 10, the deployment-limiting sheet 14 decreases the protruding speed of the right and left airbag sections 22, 24 toward the rear side during the inflation. Hence, when the occupant is out of position and located near the door 2 such that the occupant leans on the dashboard 1 for example, and when the airbag 20 starts to be inflated and the right and left airbag sections 22, 24 during the inflation contact the occupant, only a small shock is applied to the occupant from the right and left airbag sections 22, 24. Also, as described above, since the deployment-limiting sheet 14 extends along the recessed portion between the right and left airbag sections 22, 24, the deployment-limiting sheet 14 is prevented from being deviated to the left side or the right side of the airbag 20.

In this embodiment, as described above, the inflation of the airbag 20 is restrained until the shape-retaining sheet 15 releases the shape retainment, and the inflation force of the airbag 20 is partly consumed by tearing the expected tear portion 15*a* of the shape-retaining sheet 15. Thus, the inflation speed of the airbag 20 in the initial inflation phase is decreased. Accordingly, a shock absorbing effect when the airbag 20 contacts the occupant in the out-of-position state can be increased.

In this embodiment, the deployment-limiting sheet 14 extends from the center position C between the right and left airbag sections 22, 24 toward the right airbag section 22 and toward the left airbag section 24 by a length in a range of from 80 to 150 mm each.

This region faces the head part and the center portion of the chest of the occupant when the airbag 20 is inflated. Since the protruding speed of the region toward the rear side of the vehicle body is decreased by the frictional force applied between the airbag 20 and the deployment-limiting sheet 14, even when the occupant contacts the airbag 20 during the inflation in the out-of-position state, the head part and the center portion of the chest of the occupant can be gently received by the airbag 20.

At this time, when left and right side portions of the rear portion of the airbag 20 not overlapped by the deployment-limiting sheet 14 are inflated, protruding speeds of these portions toward the rear side of the vehicle body are not decreased by the deployment-limiting sheet 14. Thus, these portions immediately protrude toward the rear side of the vehicle body. As shown in FIG. 8, during the inflation of the right and left airbag sections 22, 24, the rear portion of the airbag 20 has a shape as its entirety in which an intermediate region in the left-right direction is dented toward the front side and the left and right side portions relatively protrude to the rear side. The occupant is restrained by the airbag 20 so as to be fitted into the recessed portion at the intermediate region. Accordingly, an occupant restraining effect of the airbag 20 is increased.

It is to be noted that a two-dot chain line shown in FIG. 8 shows the right and left airbag sections 22, 24 when the inflation is completed.

Figure 10:
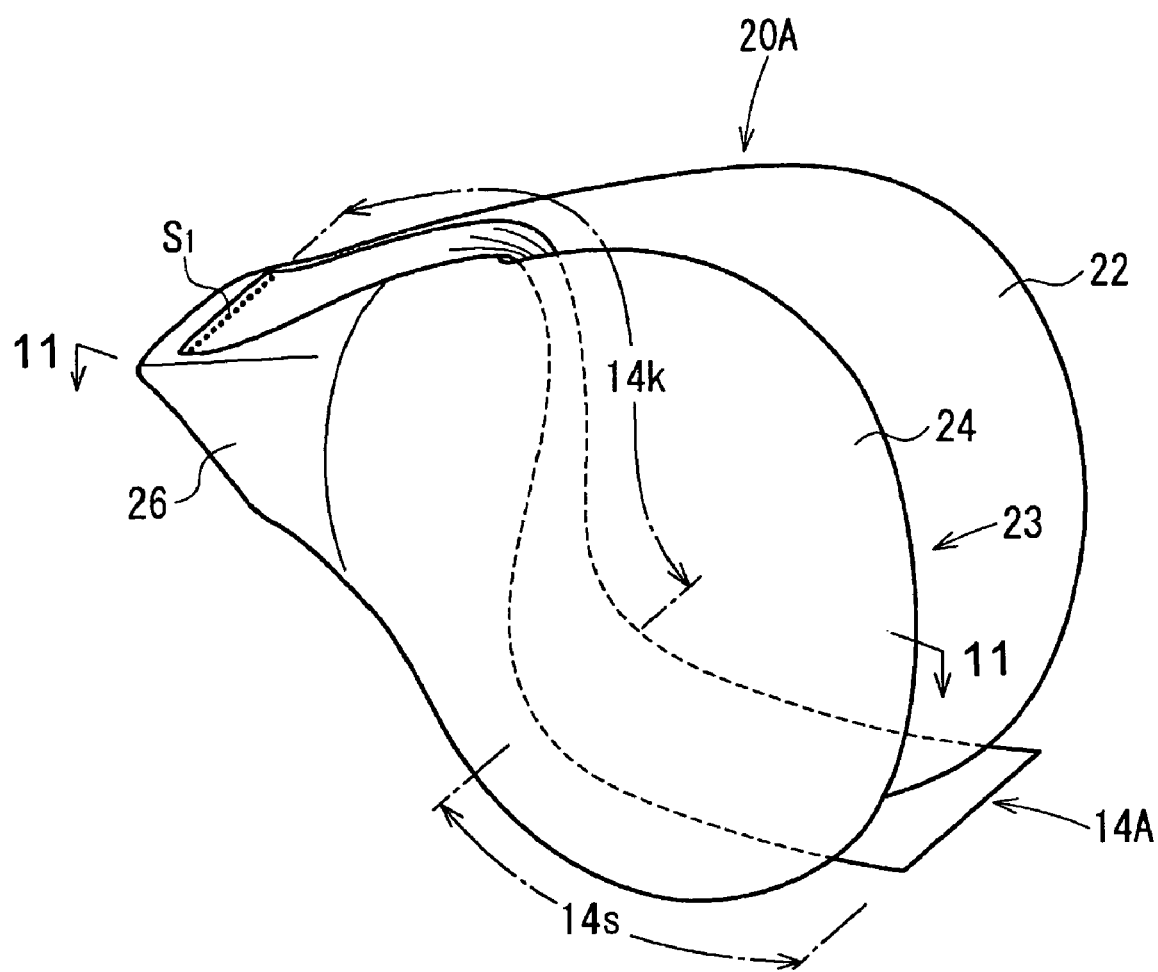
FIG. 10 is a perspective view showing an airbag of a passenger airbag apparatus according to another embodiment.
Figure 11:
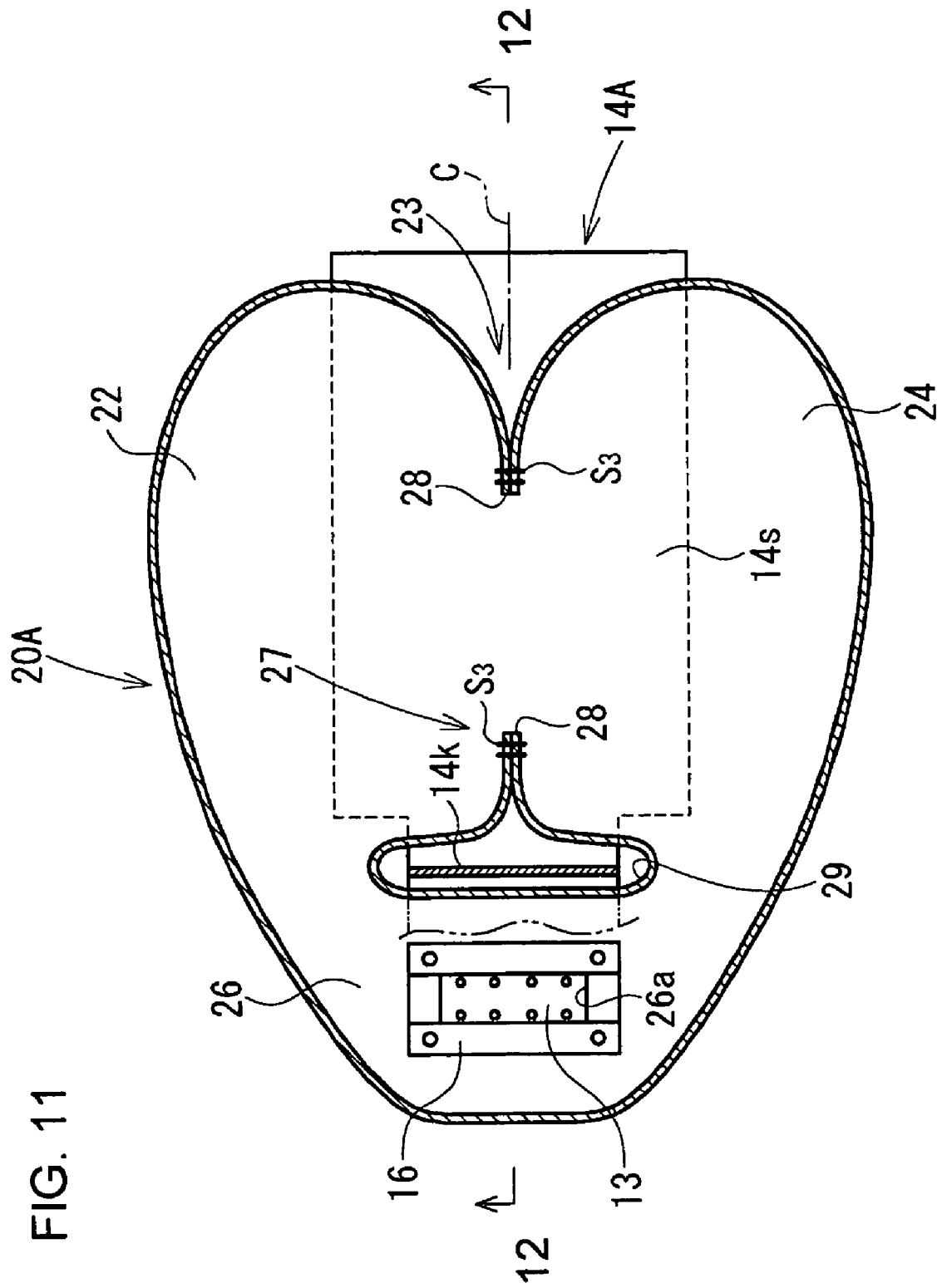
FIG. 11 is a sectional view taken along line 11-11 in FIG. 10.
Figure 12:
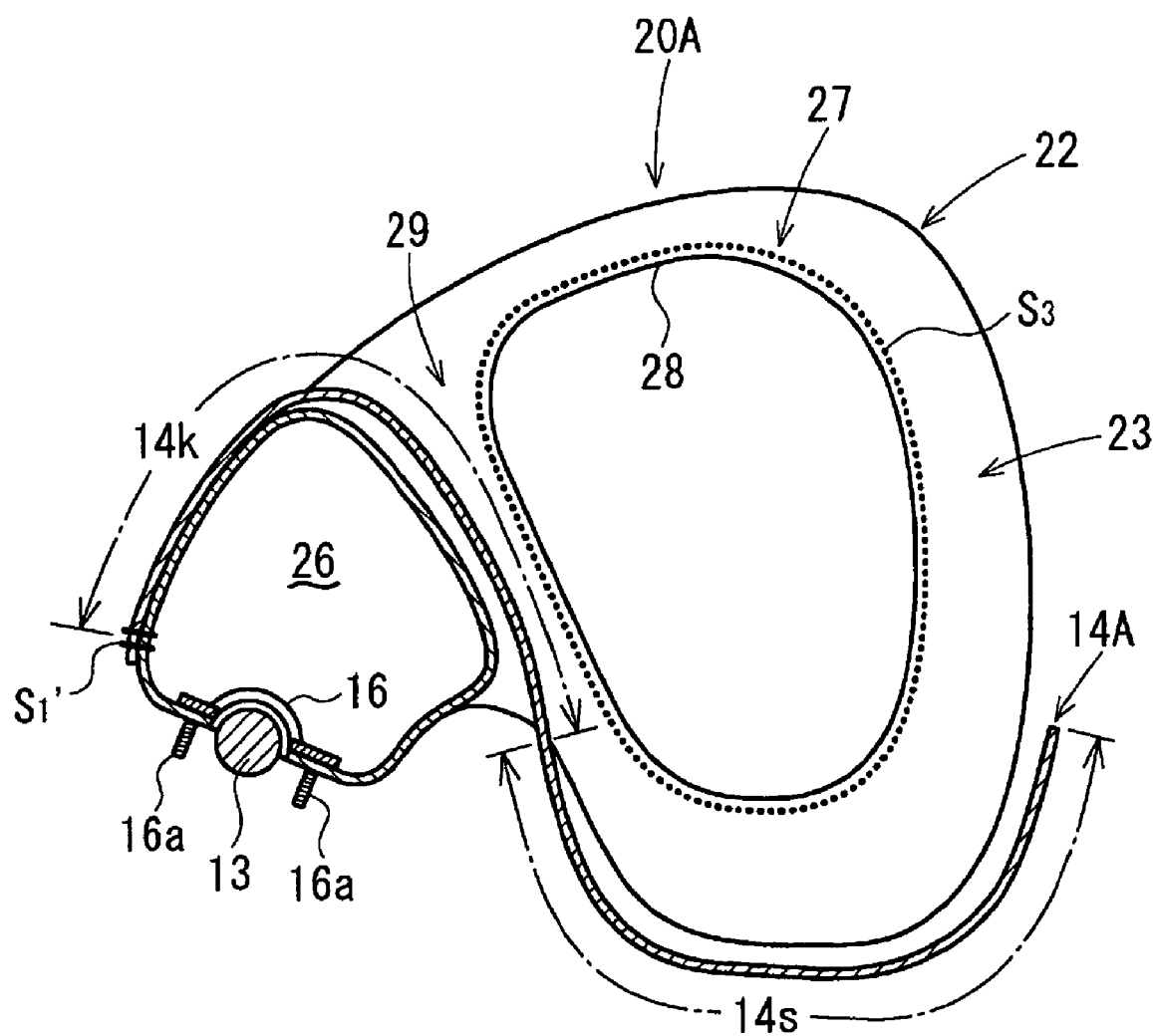
FIG. 12 is a sectional view taken along line 12-12 in FIG. 11.

FIG. 10 is a perspective view showing an airbag of a passenger airbag apparatus according to another embodiment. FIG. 11 is a sectional view taken along line 11-11 in FIG. 10. FIG. 12 is a sectional view taken along line 12-12 in FIG. 11.

An airbag 20A of this embodiment includes a coupling portion 27 which couples facing intermediate portions in the front-rear direction of right and left airbag sections 22, 24 in an inflated state.

As shown in FIG. 11, in this embodiment, facing surfaces of the right and left airbag sections 22, 24 respectively have openings 28. Peripheral edges of the openings 28 are sewed with a seam $S_3$ formed of, for example, a sewing thread. Hence, the facing surfaces of the right and left airbag sections 22, 24 are coupled together. That is, in this embodiment, the inside of the right airbag section 22 communicates with the inside of the left airbag section 24 at the coupling portion 27 through the openings 28. It is to be noted that the coupling method of the right airbag section 22 to the left airbag section 24 is not limited thereto.

As shown in FIG. 12, the coupling portion 27 (seam $S_3$) is separated from an upper surface of a base-end chamber 26 exposed to a split part between the right and left airbag sections 22, 24. A communicating portion 29 is provided between the coupling portion 27 and the base-end chamber 26. The communicating portion 29 passes between the right and left airbag sections 22, 24 to cause a front side and a rear side of the airbag 20A to communicate with each other.

As shown in FIG. 12, in this embodiment, the upper surface of the base-end chamber 26 is an inclined surface descending toward the rear side of the vehicle body. A portion of the coupling portion 27 (seam $S_3$) opposite to the upper surface of the base-end chamber 26 extends substantially in parallel to the upper surface of the base-end chamber 26. Thus, the communicating portion 29 has a tunnel-like shape extending along the upper surface of the base-end chamber 26.

As shown in FIG. 12, in this embodiment, one end (hereinafter, also referred to as base end) of a deployment-limiting sheet 14A is coupled to a front portion of the base-end chamber 26, and the other end (hereinafter, also referred to as tip end) of the deployment-limiting sheet 14A is drawn toward the rear side of the airbag 20A through the communicating portion 29. The tip end of the deployment-limiting sheet 14A is a free end. Reference character $S_1'$ is a seam formed of, for example, a sewing thread, which sews the base end of the deployment-limiting sheet 14A to an outer surface of the front portion of the base-end chamber 26. It is to be noted that the coupling method of the deployment-limiting sheet 14A to the front portion of the base-end chamber 26 is not limited thereto. Alternatively, though not shown, in the present invention, the base-end of the deployment-limiting sheet 14A may be coupled to a bottom surface of a retainer 11 or a front portion of a peripheral wall.

Hereinafter, a portion of the deployment-limiting sheet 14A extending from the coupling portion (seam $S_1'$) with the base-end chamber 26 to a part passing through the communicating portion 29 defines a base-end deployment-limiting portion 14k and a remaining portion near the tip end side defines a tip-end deployment-limiting portion 14s. As shown in FIG. 12, the base-end deployment-limiting portion 14k extends along front and upper portions of the base-end chamber 26, and the tip-end deployment-limiting portion 14s extends along rear portions of the right and left airbag sections 22, 24.

As shown in FIG. 11, also in this embodiment, the tip-end deployment-limiting portion 14s of the deployment-limiting sheet 14A is bridged across the rear portions of the right and left airbag sections 22, 24. The tip-end deployment-limiting portion 14s may be disposed to extend from a center position C between the right and left airbag sections 22, 24 toward the right airbag section 22 and toward the left airbag section 24 by a length in a range from 50 to 200 mm, respectively, and more particularly, in a range from 80 to 150 mm, respectively.

Also in this embodiment, the tip-end deployment-limiting portion 14s is disposed such that an intermediate portion of the tip-end deployment-limiting portion 14s in its width direction is located near the center position C between the right and left airbag sections 22, 24, and the right and left sections of the tip-end deployment-limiting portion 14s respectively face the right and left airbag sections 22, 24 by substantially equivalent widths. Alternatively, the tip-end deployment-limiting portion 14s may be disposed to be deviated toward the right airbag section 22 or the left airbag section 24 so that a width of a portion of the tip-end deployment-limiting portion 14s facing the right airbag section 22 differs from a width of a portion of the tip-end deployment-limiting portion 14s facing the left airbag section 24.

The length of the tip-end deployment-limiting portion 14s is greater than the distance $L_0$ (see FIG. 4) from the substantially center position of the door 2 in the front-rear direction of the vehicle body to the windshield 4 located vertically above the substantially center position.

In this embodiment, while the base-end deployment-limiting portion 14k has a width smaller than that of the tip-end deployment-limiting portion 14s, the base-end deployment-limiting portion 14k may have a width greater than that of the tip-end deployment-limiting portion 14s. The base-end deployment-limiting portion 14k may have different widths at a portion along the front portion of the base-end chamber 26 and at a portion along the upper surface of the base-end chamber 26.

To fold the airbag 20A to which the deployment-limiting sheet 14A is coupled, the base-end deployment-limiting portion 14k of the deployment-limiting sheet 14A and the airbag 20A are integrally folded while the base-end deployment-limiting portion 14k is superposed on the front portion and the upper surface of the base-end chamber 26. Then, the tip-end deployment-limiting portion 14s of the deployment-limiting sheet 14A is folded and mounted on the folded airbag 20A. Then, the shape of the folded airbag 20A and the shape of the folded deployment-limiting sheet 14A are integrally retained by a shape-retaining sheet 15 (not shown). It is to be noted that the folding method of the airbag 20A and the folding method of the deployment-limiting sheet 14A are not limited thereto.

The other structure in this embodiment is similar to that of the former embodiment shown in FIGS. 1 to 9. In FIGS. 10 to 12, numerals same as those in FIGS. 1 to 9 refer to components same as in FIGS. 1 to 9.

The passenger airbag apparatus including the airbag 20A and the deployment-limiting sheet 14A is activated as follows.

When the automobile collides, the inflator 13 is activated, and thus the airbag 20A starts to be inflated.

Though not shown, also in this embodiment, the shape of the folded airbag 20A is retained by the shape-retaining sheet 15 when the inflation of the airbag 20A is started. As the airbag 20 starts to be inflated, an inflation pressure of the airbag 20A is applied to the shape-retaining sheet 15, causing a tensile force at the shape-retaining sheet 15. When the tensile force becomes a predetermined or higher tensile force, the shape-retaining sheet 15 is torn along an expected tear portion 15a, the shape retainment of the airbag 20A is released, and the airbag 20A starts to be inflated into the cabin through the door 2, in a manner similar to FIG. 5 of the former embodiment.

When the airbag 20A is to be inflated, gas is supplied from the inflator 13 into the base-end chamber 26 first. As a result, the base-end chamber 26 starts to be inflated. In this embodiment, the deployment-limiting sheet 14A is inserted through the communicating portion 29, and the base-end deployment-limiting portion 14k of the deployment-limiting sheet 14A extends along the front portion and the upper surface of the base-end chamber 26. Accordingly, a frictional force is produced between the base-end deployment-limiting portion 14k and the front portion and the upper surface of the base-end chamber 26. This frictional force decreases an inflation speed of the base-end chamber 26.

In this embodiment, as described above, the inflation of the airbag 20A is restrained until the shape-retaining sheet 15 releases the shape retainment, and the inflation force of the airbag 20A is partly consumed by tearing the expected tear portion 15a of the shape-retaining sheet 15. Thus, the inflation speed of the airbag 20A in an initial inflation phase is decreased. Also, the frictional force between the base-end deployment-limiting portion 14k of the deployment-limiting sheet 14A and the front portion and the upper surface of the base-end chamber 26 decreases the inflation speed of the base-end chamber 26. Accordingly, the speed at which the airbag 20A protrudes from the door 2 at the initial inflation phase of the airbag 20A can be decreased.

Further, since the deployment-limiting sheet 14A is inserted through the communicating portion 29, the deployment-limiting sheet 14A is prevented from being deviated to the left side or the right side of the airbag 20A.

Thereafter, the tip-end deployment-limiting portion 14s of the deployment-limiting sheet 14A is deployed to the upper side along with the inflation of the base-end chamber 26 and the front portions of the right and left airbag sections 22, 24 to fill the space between the top panel of the dashboard 1 and the windshield 4. Then, the tip-end deployment-limiting portion 14s of the deployment-limiting sheet 14A extends along the rear portions of the right and left airbag sections 22, 24 during the inflation. Accordingly, a frictional force is produced between the tip-end deployment-limiting portion 14s, and the rear portions of the right and left airbag sections 22, 24, and a protruding speed of the right and left airbag sections 22, 24 toward the rear side of the vehicle body is decreased. That is, the tip-end deployment-limiting portion 14s provides a similar advantage to that of the deployment-limiting sheet 14 in the former embodiment.

Also in this embodiment, since the deployment-limiting sheet 14A extends along the recessed portion between the right and the left airbag sections 22, 24, the deployment-limiting sheet 14A is prevented from being deviated to the left side or the right side of the airbag 20A.

Figure 13:
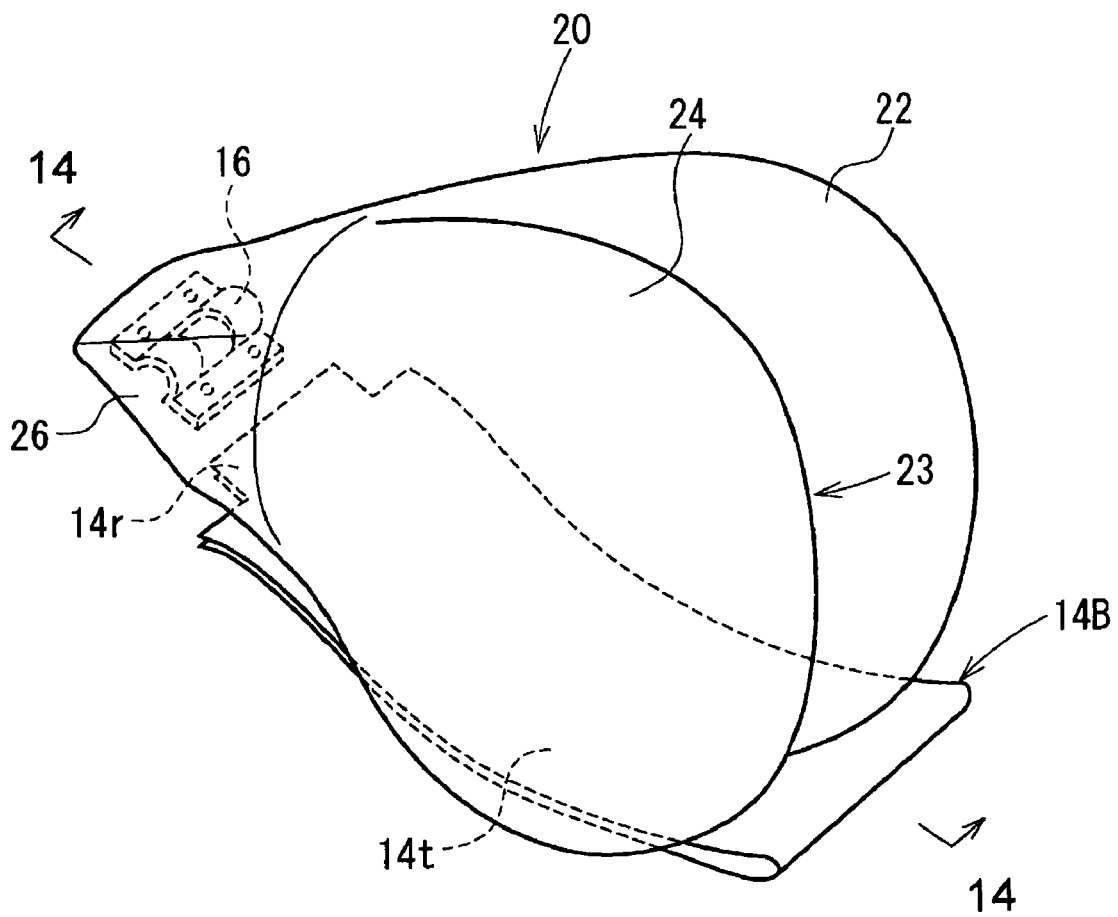
FIG. 13 is a perspective view showing another example of a deployment-limiting sheet.
Figure 14:
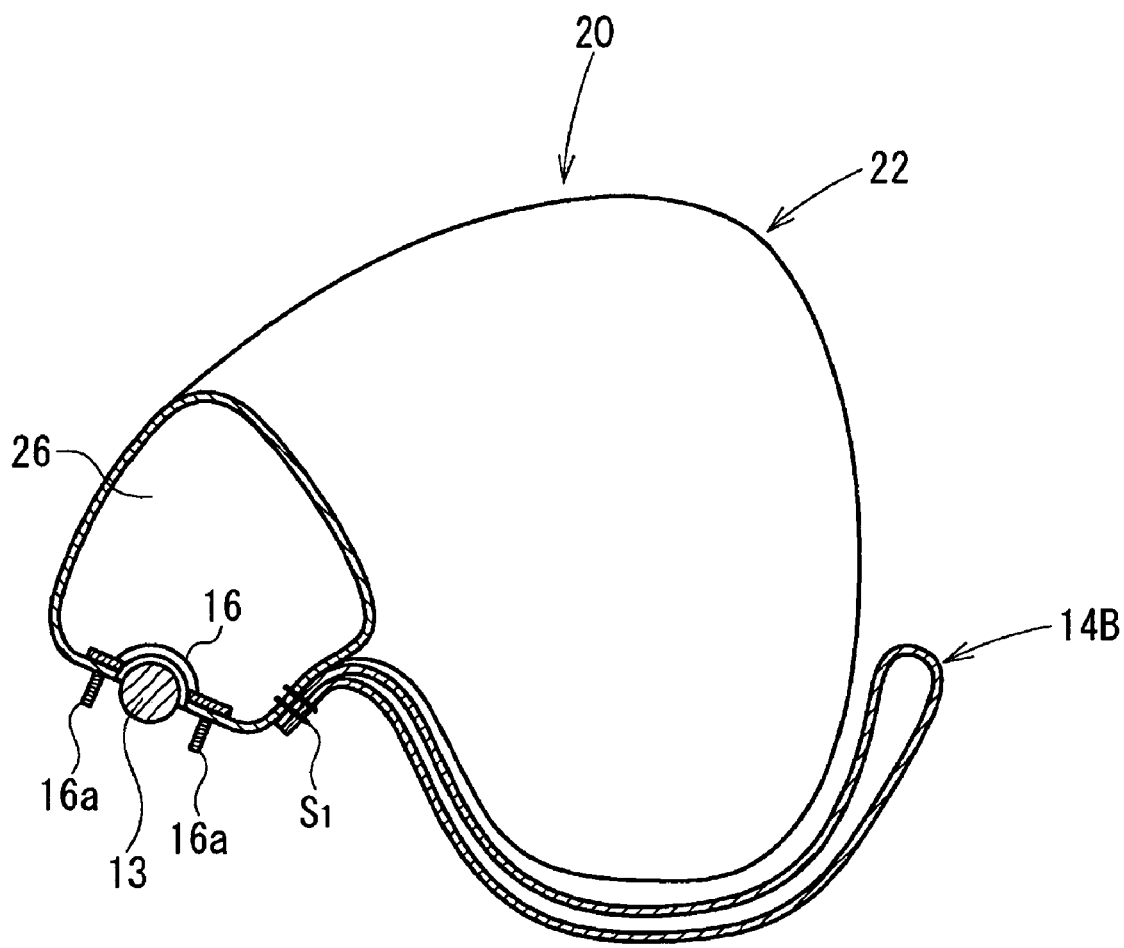
FIG. 14 is a sectional view taken along line 14-14 in FIG. 13.

FIG. 13 is a perspective view showing another configuration example of a deployment-limiting sheet. FIG. 14 is a sectional view taken along line 14-14 in FIG. 13.

In this embodiment, a deployment-limiting sheet 14B is a long strip-shaped sheet having a length substantially twice the length of the deployment-limiting sheet 14 in the former embodiment shown in FIGS. 1 to 9. The deployment-limiting sheet 14B is arranged such that the long strip-shaped sheet is folded into two at a substantially center position in its longitudinal direction, and both ends in the longitudinal direction are superposed on each other. The width, length, and shape of the deployment-limiting sheet 14B after the long strip-shaped sheet is folded into two are substantially similar to those of the deployment-limiting sheet 14 in the former embodiment shown in FIGS. 1 to 9.

The deployment-limiting sheet 14B is arranged such that a folded side, serving as a tip end, of the long strip-shaped sheet extends along the rear portions of the right and left airbag sections 22, 24, and the both ends of the long strip-shaped sheet are integrally sewed to the rear portion of the base-end chamber 26 with a seam $S_1$.

The other structure and preferable dimensions in this embodiment are similar to those of the former embodiment shown in FIGS. 1 to 9. In FIGS. 13 and 14, numerals same as those in FIGS. 1 to 9 refer to components same as in FIGS. 1 to 9.

The activation of the passenger airbag apparatus with the deployment-limiting sheet 14B is similar to the activation of the passenger airbag apparatus 10 shown in FIGS. 1 to 9.

In this embodiment, the deployment-limiting sheet 14B is formed by folding the long strip-shaped sheet into two, and has a large weight. Therefore, the frictional force produced between the deployment-limiting sheet 14B and the rear portions of the right and left airbag sections 22, 24 during inflation becomes high. Accordingly, the protruding speed of the right and left airbag sections 22, 24 toward the rear side of the vehicle body is efficiently decreased.

The deployment-limiting sheet 14B is a modification of the deployment-limiting sheet 14 shown in FIGS. 1 to 9, in which the deployment-limiting sheet 14 extends along only the rear portions of the right and left airbag sections 22, 24. Alternatively, the deployment-limiting sheet 14A shown in FIGS. 10 to 12, in which its base end is coupled to the front portion of the base-end chamber 26 and its tip end passes through the communicating portion 29 arranged above the base-end chamber 26 and then extends to the rear side of the right and left airbag sections 22, 24, may be formed by folding a long strip-shaped sheet into two in a similar manner to the deployment-limiting sheet 14B.

Figure 15:
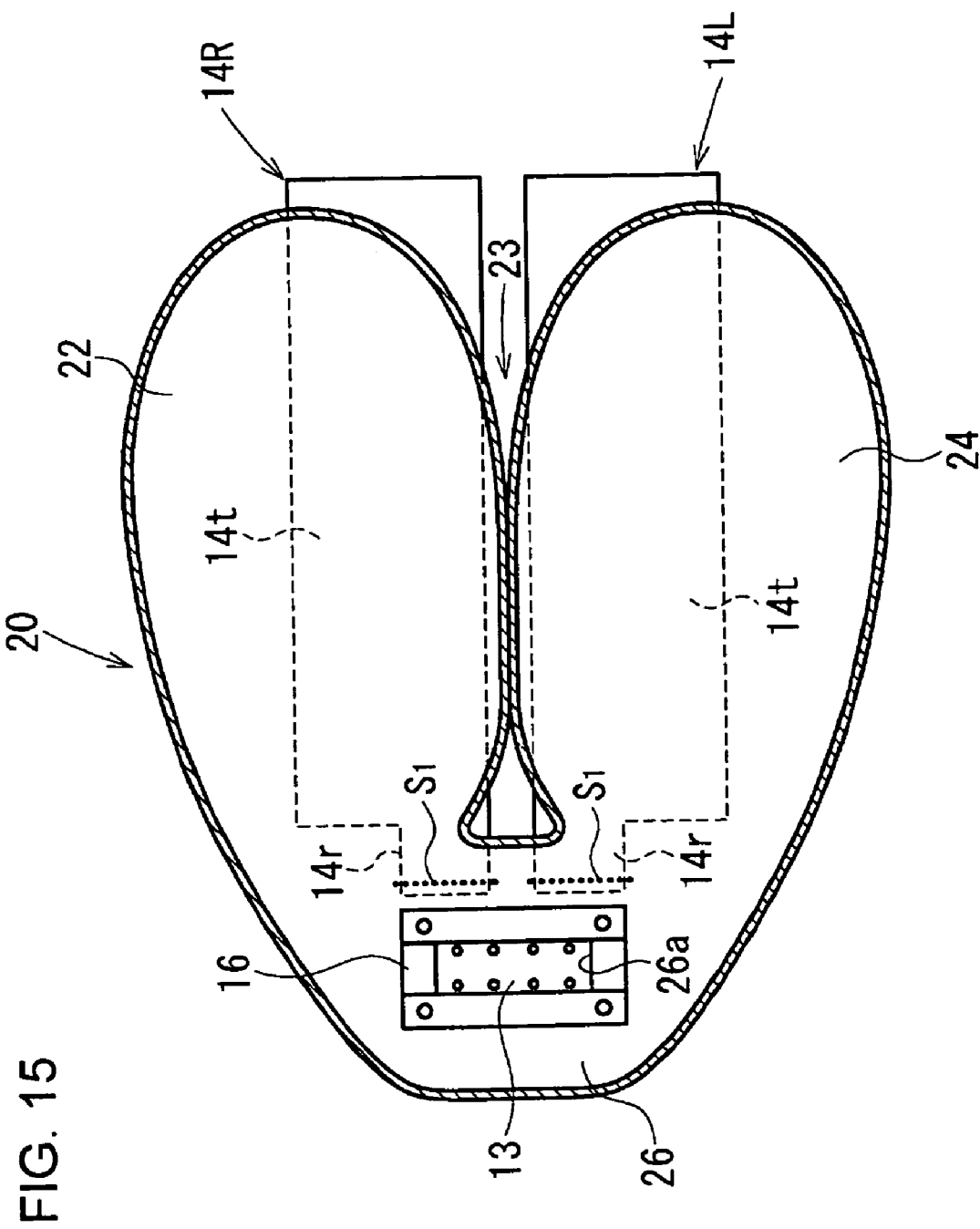
FIG. 15 is a horizontal sectional view showing still another example of a deployment-limiting sheet.

FIG. 15 is a horizontal section showing still another configuration example of a deployment-limiting sheet.

In this embodiment, a deployment-limiting sheet 14R extending along the right airbag section 22 and a deployment-limiting sheet 14L extending along the left airbag section 24 are separately provided. The deployment-limiting sheets 14R, 14L have bilaterally symmetric shapes obtained, for example, by dividing the deployment-limiting sheet 14 in the former embodiment shown in FIGS. 1 to 9 into substantially two. Alternatively, the right and left deployment-limiting sheets 14R, 14L may have different widths and lengths.

The other structure in this embodiment is similar to that of the former embodiment shown in FIGS. 1 to 9.

As described above, the deployment-limiting sheet 14R extending along the right airbag section 22 and the deployment-limiting sheet 14L extending along the left airbag section 24 are separately provided. Therefore, a protruding speed of the right airbag section 22 toward the rear side of the vehicle body and a protruding speed of the left airbag section 24 toward the rear side of the vehicle body can be adjusted independently.

This embodiment is also a modification of the embodiment shown in FIGS. 1 to 9. Alternatively, deployment-limiting sheets 14R, 14L may be provided in the embodiment shown in FIGS. 10 to 12, for example, by dividing the deployment-limiting sheet 14A into a portion extending along the right airbag section 22 and a portion extending along the left airbag section 24.

Figure 16:
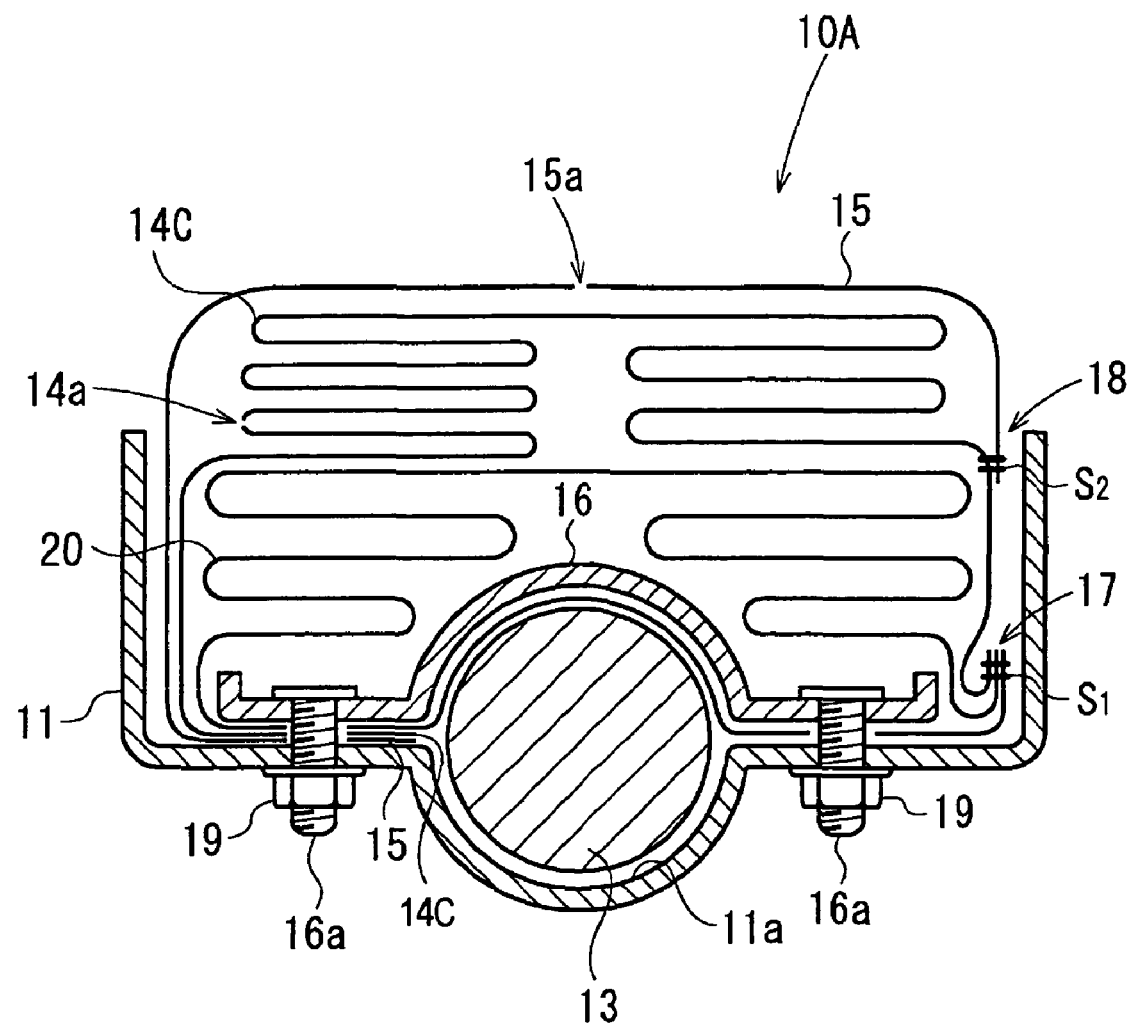
FIG. 16 is a longitudinal sectional view schematically showing a passenger-airbag apparatus according to still another embodiment.
Figure 17:
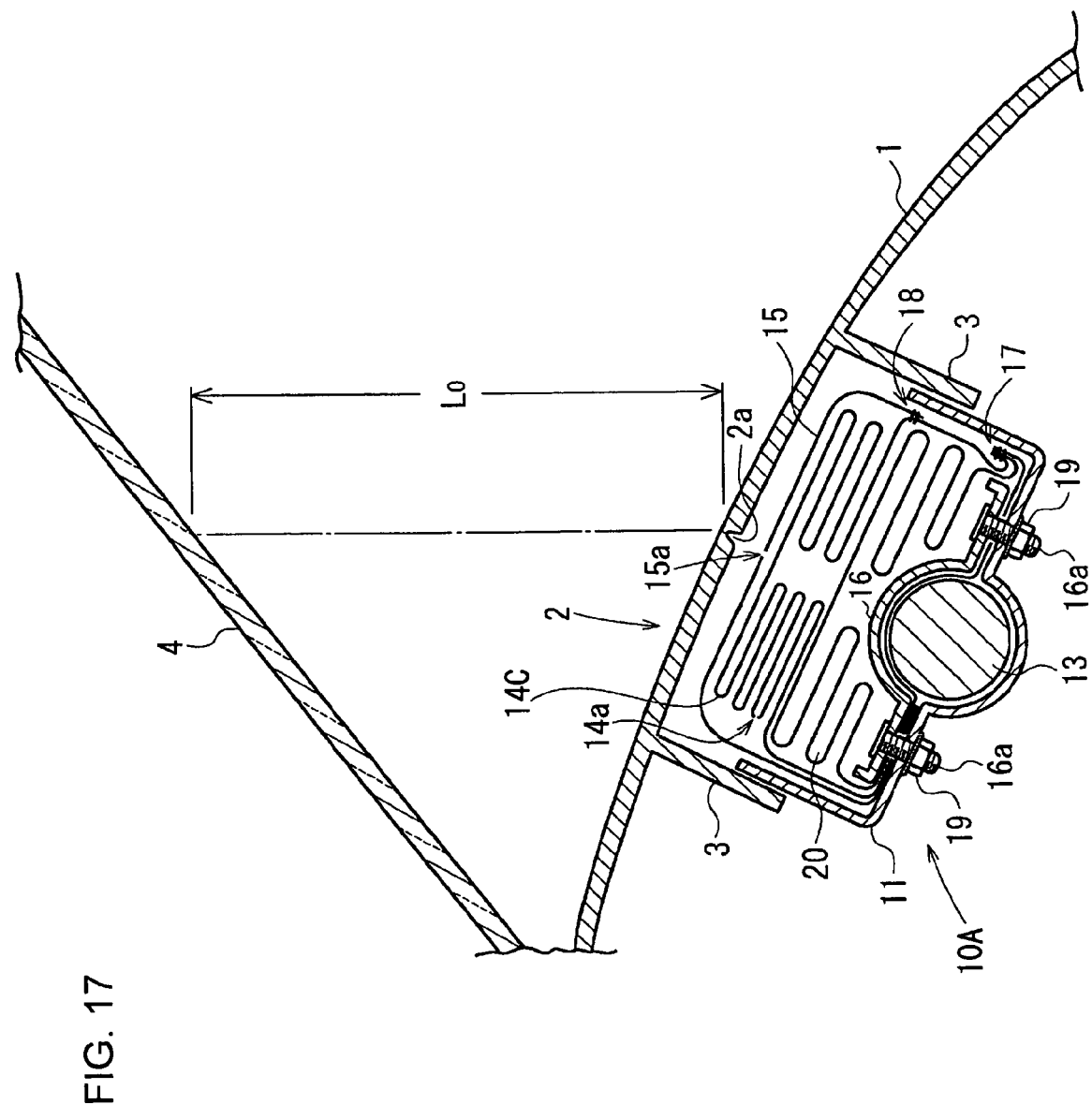
FIG. 17 is a longitudinal sectional view showing an area around an upper portion of a dashboard in a cabin, in which the passenger airbag apparatus in FIG. 16 is disposed.
Figure 18:
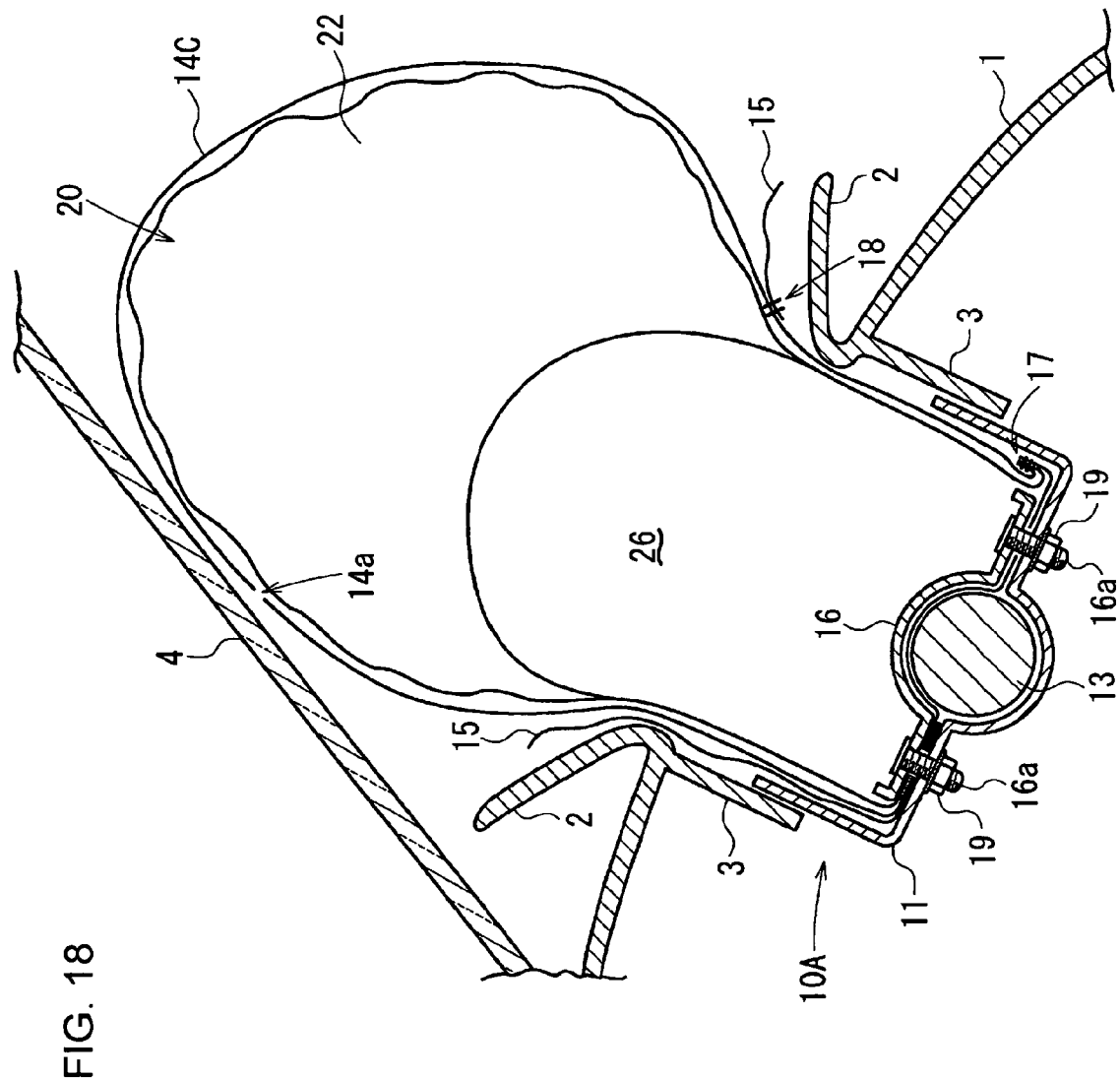
FIG. 18 is a longitudinal sectional view showing the area around the upper portion of the dashboard in the cabin, in which the passenger airbag apparatus in FIG. 16 is disposed.
Figure 19:
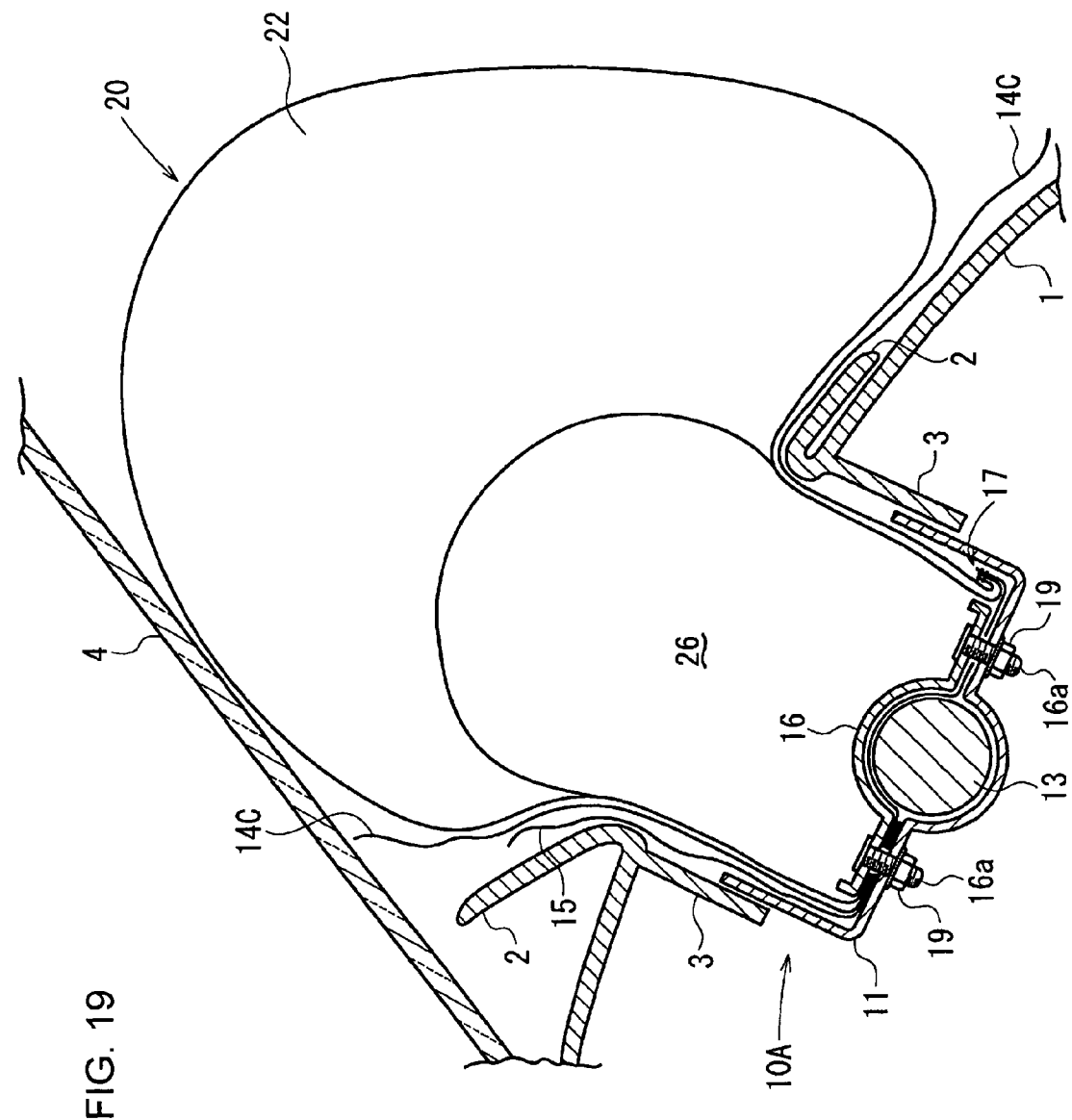
FIG. 19 is a longitudinal sectional view showing the area around the upper portion of the dashboard in the cabin, in which the passenger airbag apparatus in FIG. 16 is disposed.

FIG. 16 is a longitudinal sectional view schematically showing a passenger airbag apparatus according to still another embodiment. FIGS. 17 to 19 are longitudinal sectional views, each showing an area around an upper portion of a dashboard in a cabin, the passenger airbag apparatus in FIG. 16 being disposed in the area. FIG. 17 shows a condition before inflation of an airbag, FIG. 18 shows a condition in which a deployment-limiting sheet limits deployment of the airbag during inflation, and FIG. 19 shows a condition in which the inflation of the airbag is completed.

Similarly in this embodiment, a passenger airbag apparatus 10A includes a retainer 11, which is a top-open container arranged inside a dashboard 1 in front of a passenger seat of an automobile; a folded airbag 20 arranged in the retainer 11; an inflator 13 configured to inflate the airbag 20; a deployment-limiting sheet 14C configured to limit deployment of the airbag 20 during inflation of the airbag 20; and a shape-retaining sheet 15 configured to retain the shape of the folded airbag 20.

Also in this embodiment, one end (base end) of the deployment-limiting sheet 14C is superposed on a sewing portion 17 at a rear portion of a base-end chamber 26 of the airbag 20 and is sewed thereto with a seam $S_1$. The coupling method of the one end of the deployment-limiting sheet 14C to the airbag 20 is similar to that of the former embodiment.

In this embodiment, the deployment-limiting sheet 14C extends from the rear side of the folded airbag 20 through the upper side of the folded airbag 20 toward the front side of the vehicle body. The other end (tip end) of the deployment-limiting sheet 14C extends from the front side of the folded airbag 20 to the lower side of the folded airbag 20. A tip end of the deployment-limiting sheet 14C has a bolt insertion hole (reference numeral omitted). A front stud bolt 16a of a pressing plate 16 is inserted through the bolt insertion hole. Hence, the other end of the deployment-limiting sheet 14C is latched onto the stud bolt 16a.

An expected tear portion 14a is provided at a position nearer to the other end with respect to a center position in its longitudinal direction of the deployment-limiting sheet 14C. In this embodiment, the expected tear portion 14a is a slit with perforations extending across the deployment-limiting sheet 14C in its width direction, in a manner similar to the expected tear portion 15a of the shape-retaining sheet 15. The deployment-limiting sheet 14C is torn along the expected tear portion 14a when a predetermined or higher tensile force is applied to the deployment-limiting sheet 14C in the longitudinal direction. The deployment-limiting sheet 14C is separated into one end portion and the other end portion at the expected tear portion 14a.

A length $L_3$ (not shown) of the deployment-limiting sheet 14C from the sewing portion 17 of the deployment-limiting sheet 14C to the expected tear portion 14a is greater than a distance $L_0$ (FIG. 17) from a substantially center position of the door 2 in the front-rear direction of the vehicle body to the windshield 4 located vertically above the substantially center position.

The overall length of the deployment-limiting sheet 14C is smaller than a length of an outer periphery extending along respective surfaces at the rear side, the upper side, and the front side of the completely inflated airbag 20.

The other structure of the passenger airbag apparatus 10A in this embodiment is similar to the passenger airbag apparatus 10 of the former embodiment shown in FIGS. 1 to 9. In FIGS. 16 to 19, numerals same as those in FIGS. 1 to 9 refer to components same as in FIGS. 1 to 9.

A procedure from the folding to the shape retainment of the airbag 20 is described below.

The processes of arranging the pressing plate 16 in the airbag 20, folding the airbag 20 into a block form, and mounting the folded airbag 20 on the pressing plate 16, are similar to those in the embodiment shown in FIGS. 1 to 9.

In this embodiment, after the airbag 20 is folded, the deployment-limiting sheet 14C is drawn from the rear side of the folded airbag 20 through the upper side of the folded airbag 20 toward the front side of the vehicle body. Then, the tip end of the deployment-limiting sheet 14C is arranged to the lower side of the folded airbag 20, the front stud bolt 16a of the pressing plate 16 is inserted through the bolt insertion hole at the tip end of the deployment-limiting sheet 14C. Thereby, the deployment-limiting sheet 14C is latched onto the stud bolt 16a.

A portion of the deployment-limiting sheet 14C drawn to the upper side of the folded airbag 20 is folded into a block form, and is mounted on the folded airbag 20.

Also in this embodiment, a substantially half part near the tip end and a substantially half part near the base end of the deployment-limiting sheet 14C drawn to the upper side of the folded airbag 20 are folded in a zigzag manner, and said parts are mounted on the folded airbag 20 at different front and rear positions. However, the folding method of the deployment-limiting sheet 14C and the arrangement of the deployment-limiting sheet 14C on the folded airbag 20 are not limited thereto.

Then, similarly to the former embodiment, the shape-retaining sheet 15 is drawn from the upper side of the folded deployment-limiting sheet 14C toward the front side of the folded airbag 20. The tip end of the shape-retaining sheet 15 is arranged to the lower side of the folded airbag 20. The front stud bolt 16a of the pressing plate 16 is inserted through the bolt insertion hole at the tip end of the shape-retaining sheet 15. Thereby, the shape-retaining sheet 15 is latched onto the stud bolt 16a.

Accordingly, the shape of the folded airbag 20 and the shape of the folded deployment-limiting sheet 14C are integrally retained by the shape-retaining sheet 15.

Also in this embodiment, the inflator 13 is fitted into the recess 11a at the bottom surface of the retainer 11, and the folded airbag 20 with the shape thereof retained by the shape-retaining sheet 15 is arranged in the retainer 11, so that the pressing plate 16 is mounted on the inflator 13 from above. The stud bolts 16a are inserted through the bolt insertion holes in the bottom surface of the retainer 11, and the nuts 19 are screwed to the stud bolts 16a from below the retainer 11.

The pressing plate 16 is fixed to the bottom surface of the retainer 11, and the peripheral edge of the gas inlet at the airbag 20, the tip end of the shape-retaining sheet 15, the tip end of the deployment-limiting sheet 14C, and the inflator 13 are integrally held and fixed between the pressing plate 16 and the bottom surface of the retainer 11. Accordingly, the passenger airbag apparatus 11A shown in FIG. 16 is formed.

In the passenger airbag apparatus 10A, the deployment-limiting sheet 14C has a loop-like shape surrounding the airbag 20. In particular, the one end of the deployment-limiting sheet 14C is coupled to the rear portion of the base-end chamber 26 of the airbag 20, and the other end of the deployment-limiting sheet 14C is coupled to a front portion of a bottom surface of the retainer 11 until the expected tear portion 14a is torn.

As described above, the overall length of the deployment-limiting sheet 14C is smaller than that of the outer periphery of the completely inflated airbag 20. Therefore, during the inflation of the airbag 20, the deployment-limiting sheet 14C temporarily restrains the inflation of the airbag 20 when the inflation is in a condition where the deployment-limiting sheet 14C achieves a maximum deployment form, i.e., in which the deployment-limiting sheet 14C becomes superposed on the outer surface of the airbag 20 and is tensed. Then, when the tensile force produced at the deployment-limiting sheet 14C by an inflation pressure of the airbag 20 becomes a predetermined or higher tensile force, as shown in FIG. 19, the expected tear portion 14a is torn, the restraint by the deployment-limiting sheet 14C is released, and the airbag 20 is inflated to a maximum inflation form.

One end of a rear remaining piece produced when the deployment-limiting sheet 14C is torn is coupled to the base-end chamber 26, and the other end thereof is a free end. In a later inflation phase of the airbag 20, the rear remaining piece extends along the rear portions of the right and left airbag sections 22, 24, thereby providing a similar function to that of the deployment-limiting sheet 14 in the former embodiment.

In particular, a frictional force is produced between the rear remaining piece of the torn deployment-limiting sheet 14C and the rear portions of the right and left airbag sections 22, 24. Accordingly, a protruding speed of the right and left airbag sections 22, 24 toward the rear side, i.e., toward the passenger seat is decreased.

The expected tear portion 14a is arranged near the other end with respect to a center position in the longitudinal direction, i.e., near a front end portion of the deployment-limiting sheet 14C. Therefore, a front remaining piece produced when the expected tear portion 14a is torn has a length smaller than that of the rear remaining piece. Thus, the frictional force produced between the front remaining piece of the deployment-limiting sheet 14C and the front portions of the right and left airbag sections 22, 24 becomes smaller than that at the rear side of the vehicle body. Therefore, the front portions of the right and left airbag sections 22, 24 are inflated faster than the rear portions.

As described above, in the passenger airbag apparatus 10A, the deployment-limiting sheet 14C temporarily restrains the inflation of the airbag 20 when the airbag 20 is inflated. Further, after the restraint is released, the rear remaining piece of the deployment-limiting sheet 14C limits the inflation of the rear portions of the right and left airbag sections 22, 24. Accordingly, the protruding speed of the right and left airbag sections 22, 24 toward the rear side of the vehicle body is efficiently decreased.

Figure 20:
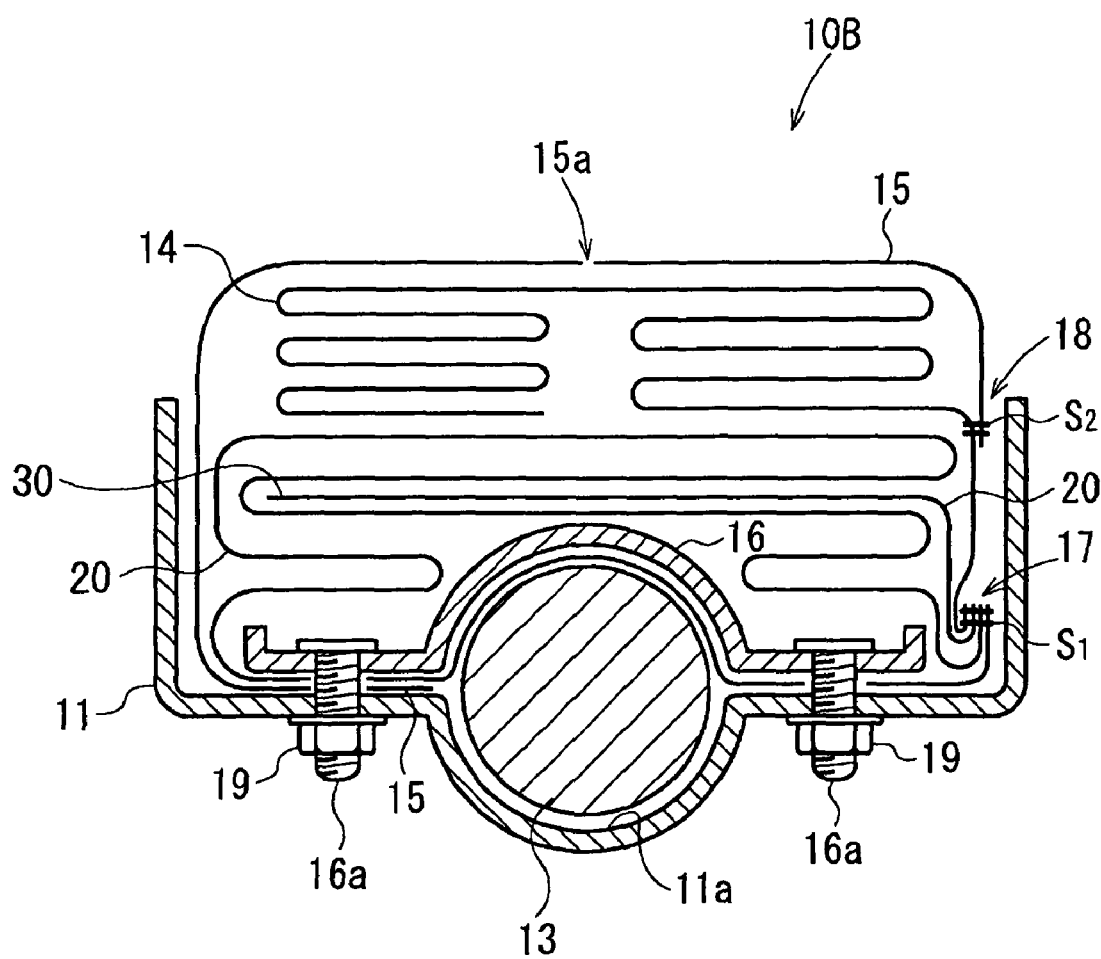
FIG. 20 is a longitudinal sectional view schematically showing a passenger airbag apparatus according to yet another embodiment.
Figure 21:
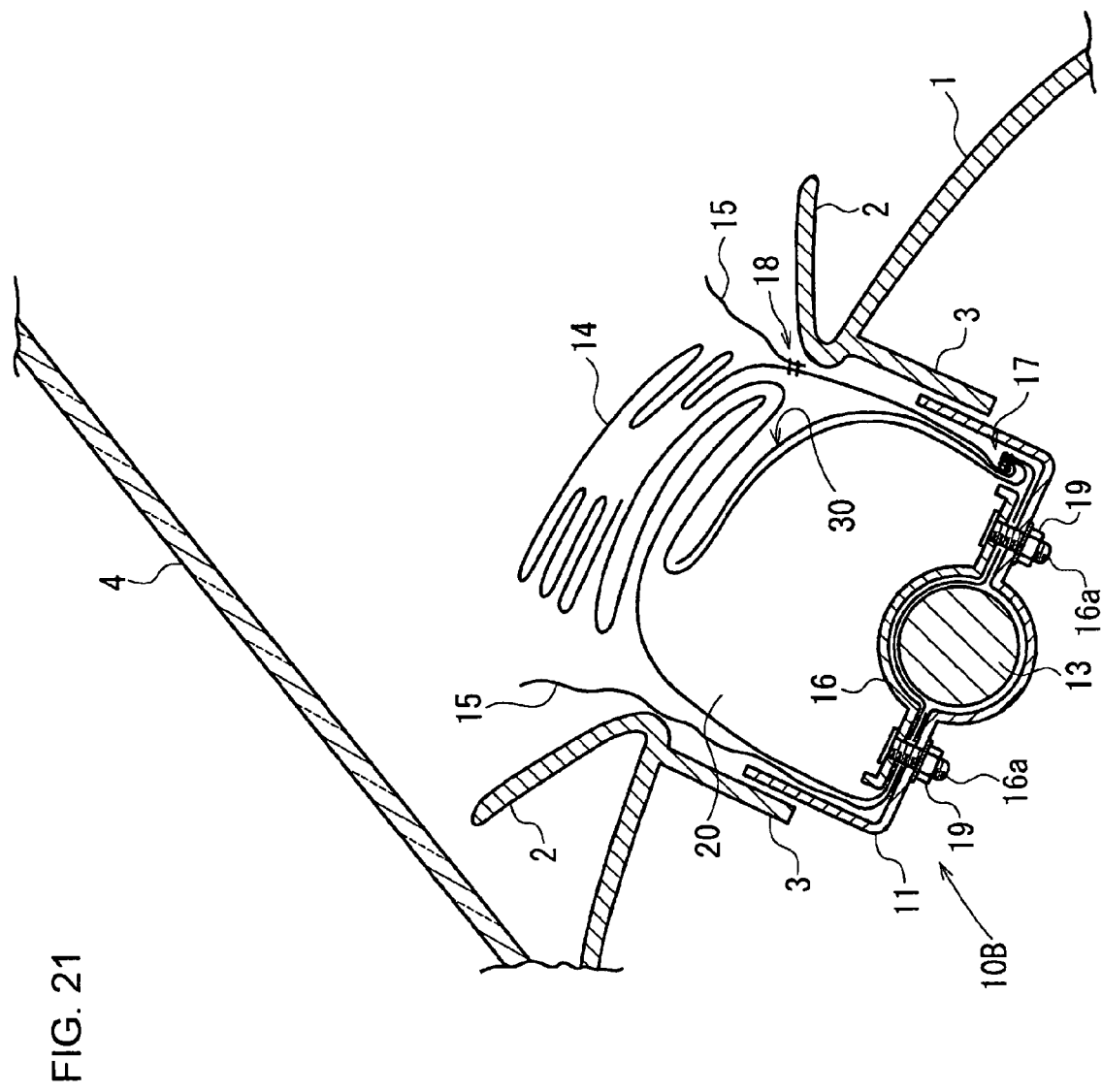
FIG. 21 is a longitudinal sectional view showing an area around an upper portion of a dashboard in a cabin, in which the passenger airbag apparatus in FIG. 20 is disposed.
Figure 22:
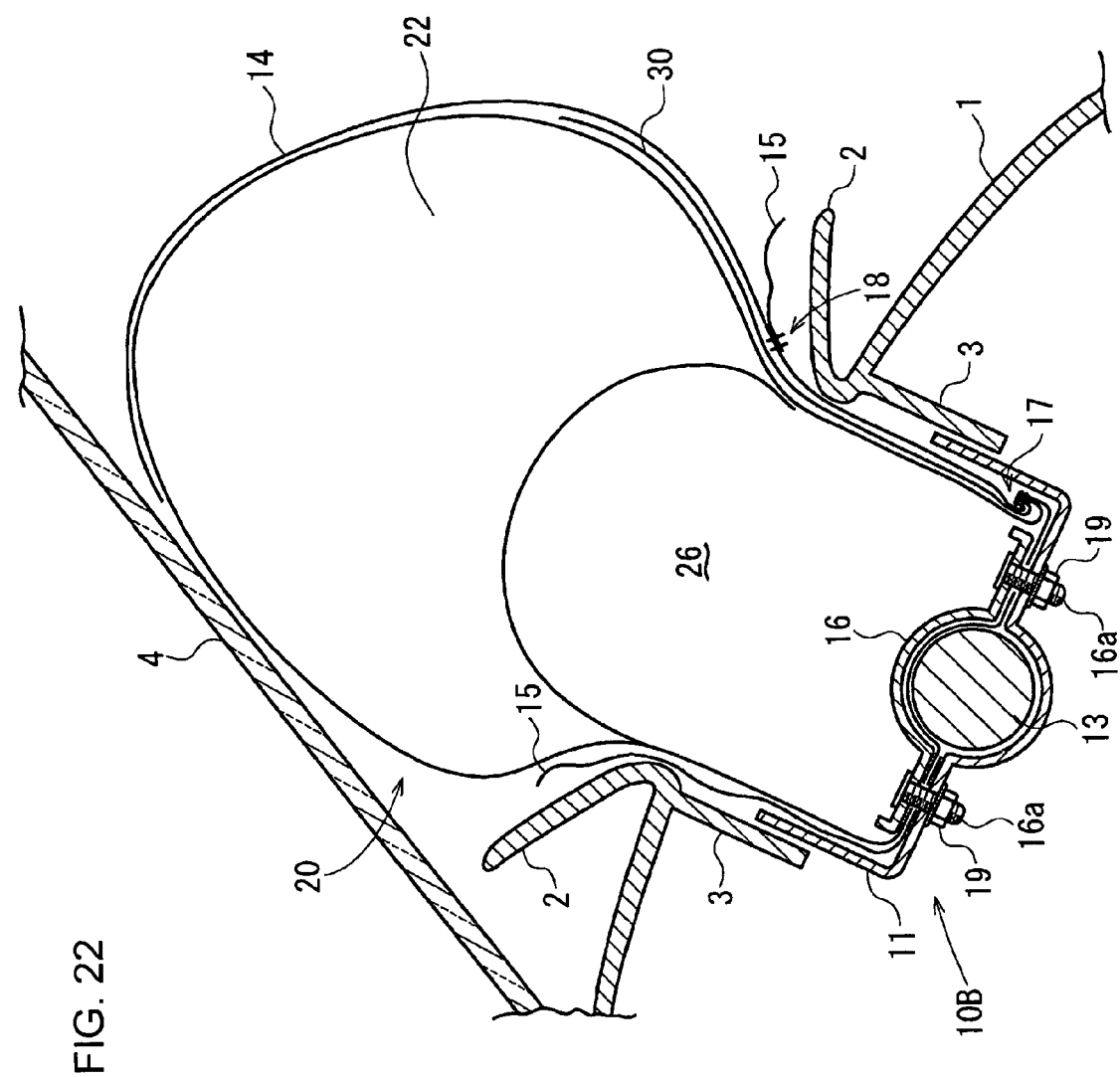
FIG. 22 is a longitudinal sectional view showing the area around the upper portion of the dashboard in the cabin, in which the passenger airbag apparatus in FIG. 20 is disposed.
Figure 23:
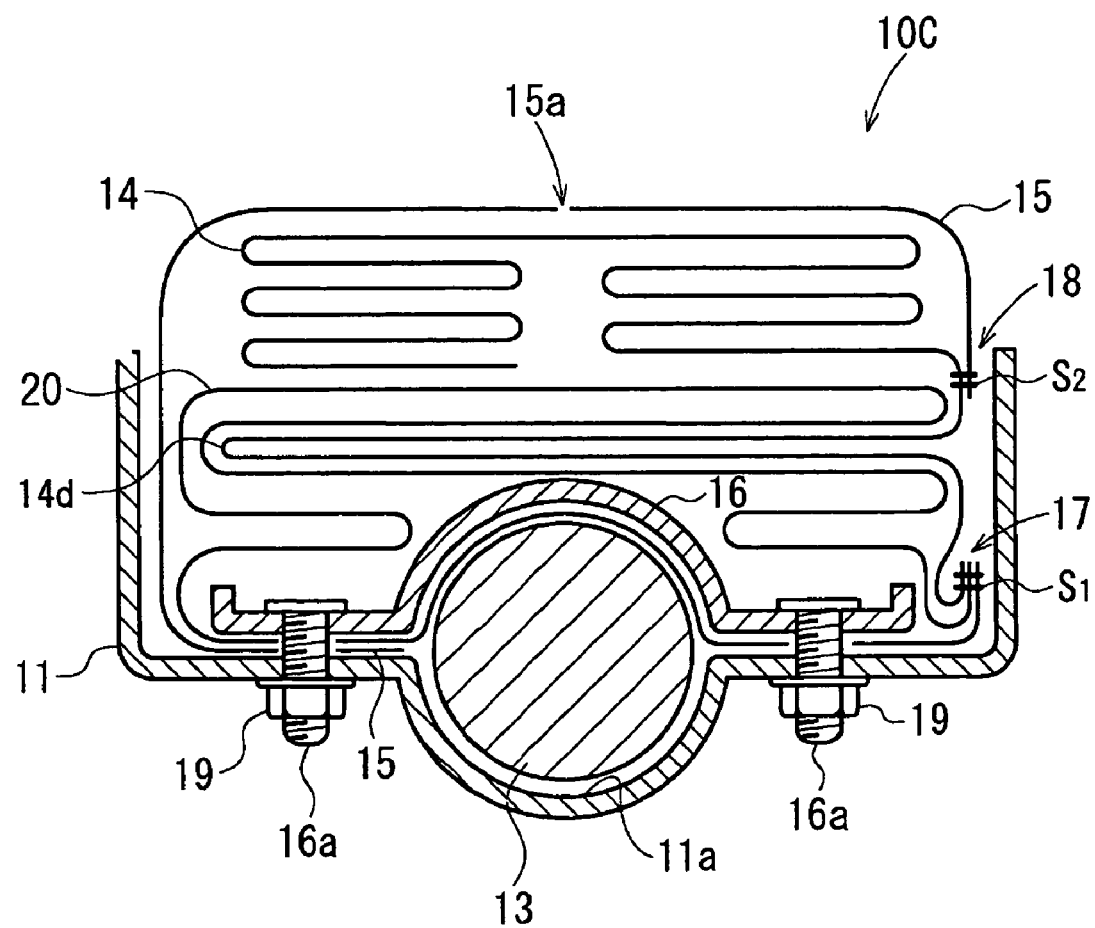
FIG. 23 is a longitudinal sectional view schematically showing a passenger airbag apparatus according to a further embodiment.

FIG. 20 is a longitudinal sectional view schematically showing a passenger airbag apparatus according to yet another embodiment. FIGS. 21 and 22 are longitudinal sectional views, each showing an area around an upper portion of a dashboard in a cabin, the passenger airbag apparatus being disposed in the area. FIG. 22 shows a condition immediately after inflation of an airbag is started, and FIG. 23 shows a condition in which a deployment-limiting sheet limits deployment of the airbag during inflation.

A passenger airbag apparatus 10B in this embodiment includes a retainer 11, which is a top-open container arranged inside a dashboard 1 in front of a passenger seat of an automobile; a folded airbag 20 arranged in the retainer 11; an inflator 13 configured to inflate the airbag 20; a deployment-limiting sheet 14 configured to limit deployment of the airbag 20 during the inflation of the airbag 20; a shape-retaining sheet 15 configured to retain the shape of the folded airbag 20; and a second deployment-limiting sheet 30 configured to decrease a protruding speed of the airbag 20 from the retainer 11.

In this embodiment, the second deployment-limiting sheet 30 is a strip-shaped sheet having a predetermined length, which is provided separately from the deployment-limiting sheet 14. The second deployment-limiting sheet 30 is arranged near the airbag 20 with respect to the deployment-limiting sheet 14, the longitudinal direction of the second deployment-limiting sheet 30 being parallel to the deployment-limiting sheet 14. One end (hereinafter, also referred to as a base end) of the second deployment-limiting sheet 30 is coupled to the deployment-limiting sheet 14.

In this embodiment, the one end of the second deployment-limiting sheet 30 is superposed on a sewing portion 17 at a rear portion of a base-end chamber 26 of the airbag 20 and is sewed thereto with a seam $S_1$, together with the one end (base end) of the deployment-limiting sheet 14.

The length of the second deployment-limiting sheet 30 may be preferably in a range from 100 to 350 mm, and more particularly, in a range from 150 to 250 mm. Also, the width of the second deployment-limiting sheet may be substantially equivalent to an opening width of the airbag. In this embodiment, the length of the second deployment-limiting sheet 30 is substantially equivalent to the width of the folded airbag 20 in the front-rear direction. Also, in this embodiment, the width of the second deployment-limiting sheet 30 is substantially equivalent to the width of the folded airbag 20 in the vehicle-body-width direction. The dimensions of the second deployment-limiting sheet 30, however, are not limited thereto.

The second deployment-limiting sheet 30 may be tucked into the folded airbag 20 when the airbag 20 is to be folded by superposing the second deployment-limiting sheet 30 on a rear surface of the airbag 20 and integrally folding it with the airbag 20. Alternatively, after the airbag 20 is folded, the second deployment-limiting sheet 30 may be inserted into a space between folded parts of the folded airbag 20 from the rear side of the vehicle body.

The second deployment-limiting sheet 30 may be preferably tucked into a space between folded parts of the base-end chamber 26 of the folded airbag 20, or a space between the folded base-end chamber 26 and the folded right and left airbag sections 22, 24.

The other structure of the passenger airbag apparatus 10B in this embodiment is similar to that of the passenger airbag apparatus 10 of the former embodiment shown in FIGS. 1 to 9. In FIGS. 20 to 22, numerals same as those in FIGS. 1 to 9 refer to the components same as in FIGS. 1 to 9.

Also, the procedure from the folding to the shape retainment of the airbag 20 in this embodiment is similar to that in the embodiment shown in FIGS. 1 to 9 except that the second deployment-limiting sheet 30 is tucked into the folded airbag 20.

In the passenger airbag apparatus 10B, since the second deployment-limiting sheet 30 is tucked into the folded airbag 20, when the airbag 20 is inflated, a frictional force is generated between the second deployment-limiting sheet 30 and the outer surface of the airbag 20 as shown in FIG. 21. Thus, the frictional force decreases an inflation speed in an initial inflation phase of the airbag 20. Accordingly, the protruding speed of the airbag 20 from the door 2 is efficiently decreased.

A later inflation phase of the airbag 20 is similar to that of the passenger airbag apparatus shown in FIGS. 1 to 9. In particular, also in the passenger airbag apparatus 10B, as the airbag 20 starts to be inflated to the space between the dashboard 1 and the windshield 4, as shown in FIG. 22, the deployment-limiting sheet 14 extends along the rear portions of the right and left airbag sections 22, 24 during the inflation, and the frictional force produced between the deployment-limiting sheet 14 and the right and left airbag sections 22, 24 decreases the protruding speed of the right and left airbag sections 22, 24 toward the rear side of the vehicle body.

While the passenger airbag apparatus 10B is configured such that the second deployment-limiting sheet 30 is provided in the embodiment shown in FIGS. 1 to 9, a second deployment-limiting sheet may be similarly provided in any of other embodiments instead of the embodiment shown in FIGS. 1 to 9.

In this embodiment, while the length of the second deployment-limiting sheet 30 is substantially equivalent to the width of the folded airbag 20 in the front-rear direction, the length of the second deployment-limiting sheet 30 may be greater than the width of the folded airbag 20 in the front-rear direction. In this case, the second deployment-limiting sheet 30 may be integrally folded with the airbag 20, or may be folded independently from the airbag 20 and the folded second deployment-limiting sheet 30 may be inserted into a space between folded parts of the folded airbag 20.

In this embodiment, while the second deployment-limiting sheet 30 is coupled to the rear portion of the base-end chamber 26 of the airbag 20 together with the deployment-limiting sheet 14, the second deployment-limiting sheet 30 may be coupled to a rear portion of the retainer 11. Alternatively, the second deployment-limiting sheet 30 may be coupled to an intermediate portion in the longitudinal direction of the deployment-limiting sheet 14.

In this embodiment, while the second deployment-limiting sheet 30 is provided separately from the deployment-limiting sheet 14, the second deployment-limiting sheet 30 may be integrally provided with the deployment-limiting sheet 14. Alternatively, instead of providing the second deployment-limiting sheet 30, a part of the deployment-limiting sheet 14 may be tucked into the folded airbag 20. FIG. 23 is a longitudinal sectional view schematically showing a passenger airbag apparatus 10C thusly configured.

In the passenger airbag apparatus 10C shown in FIG. 23, a base end of a deployment-limiting sheet 14 is partly pulled toward the front side of the vehicle body, thereby forming a folded pulled portion 14d. The pulled portion 14d is tucked into the folded airbag 20 from the rear side of the vehicle body. The pulled portion 14d may be tucked into the folded airbag 20 when the airbag 20 is to be folded by superposing the pulled portion 14d on a rear portion of the airbag 20 and integrally folding it with the airbag 20. Alternatively, after the airbag 20 is folded, the pulled portion 14d may be inserted into a space between folded parts of the folded airbag 20 from the rear side of the vehicle body. The other structure of the passenger airbag apparatus 10C in this embodiment is similar to that of the passenger airbag apparatus 10 of the former embodiment shown in FIGS. 1 to 9. In FIG. 23, numerals the same as those in FIGS. 1 to 9 refer components the same as those in FIGS. 1 to 9.

Also in the passenger airbag apparatus 10C, when the airbag 20 is inflated, a frictional force is produced between the pulled portion 14d of the deployment-limiting sheet 14 tucked into the folded airbag 20 and the outer surface of the airbag 20. Thus, the frictional force decreases an inflation speed of the airbag 20. That is, in the passenger airbag apparatus 10C, the pulled portion 14d functions as a second deployment-limiting sheet.

In the passenger airbag apparatus 10C, it is not necessary to couple a second deployment-limiting sheet to the airbag 20, the deployment-limiting sheet 14, or the retainer.

In this embodiment, the pulled portion 14d is formed at the intermediate portion of the deployment-limiting sheet 14 in the passenger airbag apparatus 10 shown in FIGS. 1 to 9 and the pulled portion 14d is tucked into the folded airbag 20. Alternatively, a pulled portion may be formed in any of other embodiments by partly pulling a deployment-limiting sheet similarly, and the pulled portion may be tucked into a folded airbag.

In the above-described embodiments, the substantially half part near the front side of the vehicle body and the substantially half part near the rear side of the vehicle body of the deployment-limiting sheet 14 drawn to the upper side of the folded airbag 20 are folded in a zigzag manner, and such parts are mounted on the folded airbag 20 at different front and rear positions. However, the folding method of the deployment-limiting sheet is not limited thereto, and the deployment-limiting sheet may be folded by a folding method other than zigzag folding. For example, the deployment-limiting sheet may be rolled by a combination of a plurality of folding methods. Also, the arrangement of the folded deployment-limiting sheet is not limited thereto.

Figure 24:
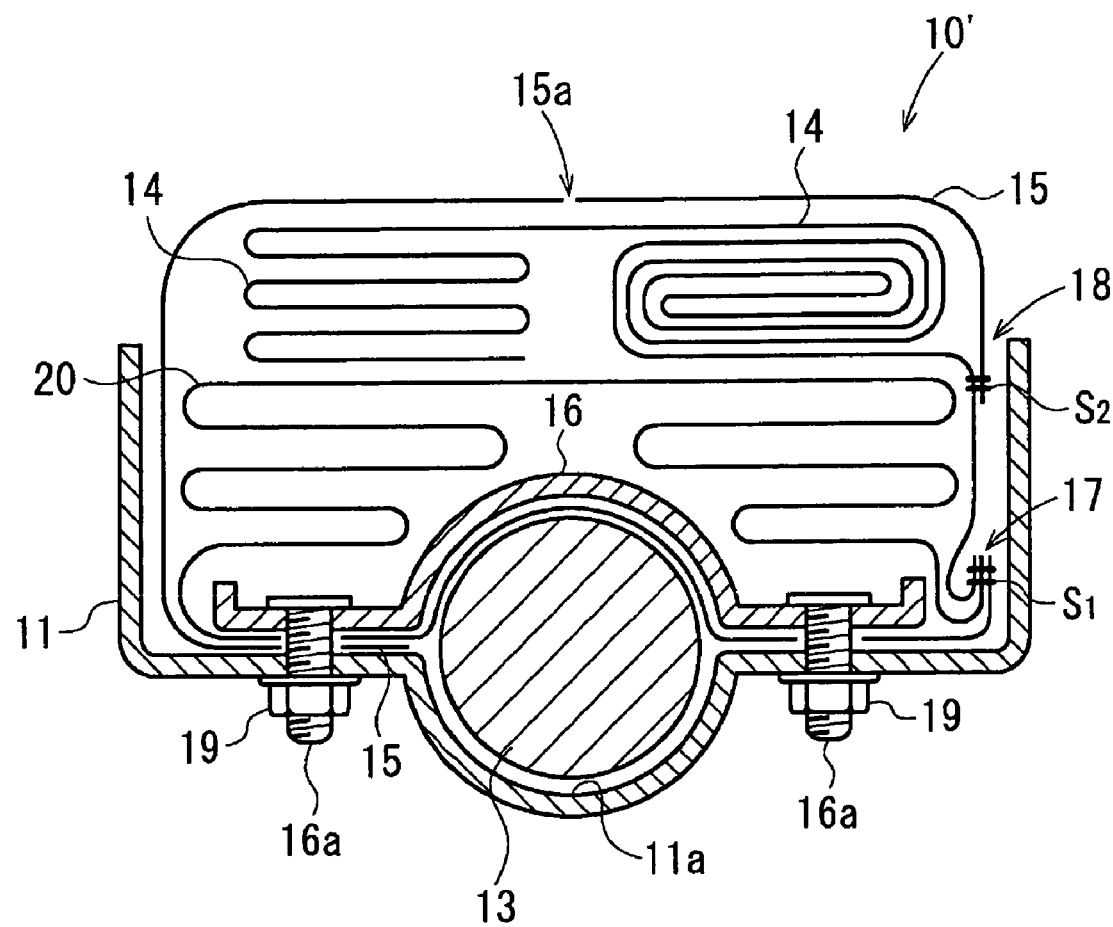
FIG. 24 is a vertical sectional view schematically showing a passenger airbag apparatus, illustrating another folding method of a deployment-limiting sheet.

FIG. 24 shows another exemplary folding method of a deployment-limiting sheet.

In a passenger airbag apparatus 10' shown in FIG. 24, a substantially half part, near the front side of the vehicle body, of a deployment-limiting sheet 14 drawn to the upper side of a folded airbag 20 is folded in a zigzag manner, and a substantially half part near the rear side of the vehicle body is rolled. Alternatively, the front portion of the deployment-limiting sheet 14 may be rolled, and the rear portion of the deployment-limiting sheet 14 may be folded in a zigzag manner. Still alternatively, both portions may be rolled. Yet alternatively, the front and rear portions of the deployment-limiting sheet 14 may be partly rolled and remaining parts may be folded in a zigzag manner. Of course, the deployment-limiting sheet 14 may be folded by any other folding method.

While FIG. 24 shows an example of the folding method of the deployment-limiting sheet 14, any of the deployment-limiting sheets 14A to 14C in other embodiments may be folded by a folding method other than the illustrated method.

The above-described embodiments merely show examples of the present invention. Therefore, the present invention is not limited to the illustrated configurations.

The disclosure of Japanese Patent Application No. 2008-143017 filed on May 30, 2008 is incorporated as a reference.

While the invention has been explained with reference to the specific embodiments of the invention, the explanation is illustrative and the invention is limited only by the appended claims.

What is claimed is:

1. An airbag apparatus for a vehicle, comprising:
   an airbag having a left airbag section and a right airbag section inflatable at left and right sides in a front area of an occupant;
   a retainer for retaining the airbag;
   a first deployment-limiting sheet having a first end coupled to a rear portion of the airbag, said first deployment-limiting sheet at least partly overlapping the airbag and extending along the airbag from the rear portion to a front portion of the airbag,
   wherein the first deployment-limiting sheet extends along the rear portion of the airbag during inflation thereof; and
   a first shape-retaining sheet having a first end coupled to a front portion of the retainer and a second end directly connected to the first deployment-limiting sheet by a seam, the first shape-retaining sheet retaining a shape of a folded airbag and a shape of the first deployment-limiting sheet and having a shape-retainment release portion for releasing a shape of the folded airbag by inflation of the airbag.

2. The airbag apparatus according to claim 1, wherein the first deployment-limiting sheet has a second end coupled to a front portion of the retainer in a front-rear direction of the vehicle, and the first deployment-limiting sheet has a first tear line provided near the second end of the first deployment-limiting sheet for allowing the first deployment-limiting sheet to be torn by a tensile force applied to the first tear line upon inflation.

3. The passenger airbag apparatus according to claim 2, wherein:
   the retainer is disposed in a dashboard proximate a windshield;
   a door is defined by a portion of a top panel of the dashboard covering the retainer;
   a groove in the door defines a door tear line whereby the door is configured to be cleaved by an inflation pressure of the airbag and open to a cabin when the airbag is inflated; and
   a length of the first deployment-limiting sheet from the coupling of the deployment-limiting sheet with the airbag to the first tear line, is greater than a distance $L_0$, wherein the distance $L_0$ is a distance from a substantially center position of the door to the windshield located vertically above the substantially center position.

4. The airbag apparatus according to claim 1, wherein the first shape-retaining sheet includes a shape-retainment release portion for releasing a shape of the airbag upon inflation.

5. The airbag apparatus according to claim 4, wherein the shape-retainment release portion is a second tear line for allowing the first shape-retaining sheet to be torn when a tensile force applied to the first shape-retaining sheet becomes a predetermined tensile force.

6. The airbag apparatus according to claim 1, further comprising a second deployment-limiting sheet having a base end coupled to a rear portion of the retainer in a front-rear direction of the vehicle or the first deployment-limiting sheet, and a tip end tucked into the airbag.

7. The airbag apparatus according to claim 1, further comprising an inflator connected to the airbag for inflating the airbag, and a lid member provided onto the retainer so as to cover the retainer.

8. The airbag apparatus according to claim 1, wherein the first deployment-limiting sheet and the rear portion of the airbag generate a frictional force therebetween so as to reduce a protruding speed of the rear portion of the airbag during inflation.

9. The passenger airbag apparatus according to claim 1, wherein the airbag includes a base end connected to the left and right airbag sections, and a communicating portion provided between the left and right airbag sections for communicating the front and rear portions of the airbag, the first end of the first deployment-limiting sheet being coupled to the base end between the left and right airbag sections.

10. The passenger airbag apparatus according to claim 9, wherein the first deployment-limiting sheet has a second end free of connection, the first deployment-limiting sheet being folded and the folded first deployment-limiting sheet and the second end being disposed on a folded airbag when the airbag is retained in the retainer.

11. The airbag apparatus according to claim 1, wherein the first end of the first deployment-limiting sheet is coupled to the airbag by another seam.

12. The airbag apparatus according to claim 11, wherein the seam and the another seam are spaced apart from each other.

13. An airbag apparatus for a vehicle, comprising:
an airbag having a left airbag section and a right airbag section inflatable at left and right sides in a front area of an occupant;
a retainer for retaining the airbag; and
a first deployment-limiting sheet having a first end coupled to one of the retainer and a rear portion of the airbag, said first deployment-limiting sheet at least partly overlapping the airbag and extending along the airbag from the rear portion to a front portion of the airbag,
wherein the first deployment-limiting sheet extends along the rear portion of the airbag during inflation thereof, and
a first shape-retaining sheet having a first end coupled to a front portion of the retainer and a second end coupled to the first deployment-limiting sheet, the first shape-retaining sheet retaining a shape of a folded airbag and the shape of the first deployment-limiting sheet and having a shape-retainment release portion for releasing a shape of the folded airbag by inflation of the airbag,
wherein the airbag includes a recessed portion provided between the left and right airbag sections, and the first deployment-limiting sheet extends along the recessed portion during inflation.

14. An airbag apparatus for a vehicle, comprising:
an airbag having a left airbag section and a right airbag section inflatable at left and right sides in a front area of an occupant;
a retainer for retaining the airbag; and
a first deployment-limiting sheet having a first end coupled to one of the retainer and a rear portion of the airbag at a location spaced from the retainer, said first deployment-limiting sheet at least partly overlapping the airbag and extending along the airbag from a rear portion to a front portion of the airbag,
wherein the first deployment-limiting sheet extends along the rear portion of the airbag during inflation thereof,
wherein the airbag includes middle portions at the left and the right airbag sections in a front-rear direction of the vehicle, and a coupling portion for coupling the middle portions, the middle portions facing each other during inflation,
wherein the airbag includes a base end connected to the left and right airbag sections, and a communicating portion provided between the base end of the airbag and the coupling portion and between the left and the right airbag sections for communicating the front and rear portions of the airbag, and
wherein the first deployment-limiting sheet has a second end passing through the communicating portion and extending to the rear portion of the airbag.

* * * * *